(12) United States Patent
Preston et al.

(10) Patent No.: US 11,846,314 B2
(45) Date of Patent: Dec. 19, 2023

(54) CONNECTOR

(71) Applicant: Balltec Limited, Morecambe (GB)

(72) Inventors: Jonathan Scott Preston, Preston (GB); William David Loton Parry, Preston (GB); Daniel O'Connor, Carnforth (GB)

(73) Assignee: Balltec Limited, Morecambe (GB)

( * ) Notice: Subject to any disclaimer, the term of this patent is extended or adjusted under 35 U.S.C. 154(b) by 1351 days.

(21) Appl. No.: 15/770,168

(22) PCT Filed: Oct. 19, 2016

(86) PCT No.: PCT/GB2016/053247
§ 371 (c)(1),
(2) Date: Apr. 20, 2018

(87) PCT Pub. No.: WO2017/068343
PCT Pub. Date: Apr. 27, 2017

(65) Prior Publication Data
US 2018/0306222 A1    Oct. 25, 2018

(30) Foreign Application Priority Data

Oct. 23, 2015  (GB) ..................................... 1518829
Jan. 20, 2016  (GB) ..................................... 1601087

(51) Int. Cl.
*F16B 7/04* (2006.01)
*H02G 1/10* (2006.01)
(Continued)

(52) U.S. Cl.
CPC ............... *F16B 7/042* (2013.01); *F03D 1/00* (2013.01); *F03D 80/00* (2016.05); *F16B 7/1409* (2013.01);
(Continued)

(58) Field of Classification Search
CPC ...... F16B 7/042; F16B 7/0406; F16B 7/0413; F16B 7/025; F16B 7/1409; F16B 2/16;
(Continued)

(56) References Cited

U.S. PATENT DOCUMENTS 3,019,502 A    2/1962  Walker, Jr.
3,266,825 A *  8/1966  Magorien ........... F16L 27/0832
                                              285/277
(Continued)

FOREIGN PATENT DOCUMENTS

AT        263281 B  *  7/1968
DE       1115998 B  * 10/1961
(Continued)

OTHER PUBLICATIONS

Korean Intellectual Property Office Notice of Submission of Written Opinion issued in KR Application No. 10-218-7014082, dated Sep. 18, 2023; 20 pages including English translation.

*Primary Examiner* — Jonathan P Masinick
(74) *Attorney, Agent, or Firm* — Schwabe, Williamson & Wyatt, PC

(57) ABSTRACT

An elongate connector for subsea connection of cables and the like to wind turbine generators has a plurality of locking elements arranged on ramp surfaces and held in a plurality of cages on the connector. The cages are moveable to move the locking elements along the ramp surfaces between an engaged position and a disengaged position and the plurality of cages are moveable independently of each other. A release collar is provided, which can move all the cages simultaneously to the disengaged position, in order to allow removal of the connector.

19 Claims, 26 Drawing Sheets

(51) Int. Cl.
  *F03D 80/00* (2016.01)
  *H02G 9/02* (2006.01)
  *F16L 1/20* (2006.01)
  *F03D 1/00* (2006.01)
  *F16B 7/14* (2006.01)
  *H02G 9/12* (2006.01)
  *F16B 2/16* (2006.01)

(52) U.S. Cl.
  CPC .................. *F16L 1/20* (2013.01); *H02G 1/10* (2013.01); *H02G 9/02* (2013.01); *H02G 9/12* (2013.01); *F16B 2/16* (2013.01); *Y02E 10/72* (2013.01)

(58) Field of Classification Search
  CPC ...... H02G 15/076; H02G 15/06; F03D 11/00; F03D 80/80; F16L 37/23; F16L 37/22
  See application file for complete search history.

(56) References Cited

U.S. PATENT DOCUMENTS

| | | | | |
|---|---|---|---|---|
| 3,267,963 A | * | 8/1966 | Hupp | ...................... F16L 37/33 |
| | | | | 285/391 |
| 5,967,477 A | * | 10/1999 | Walmsley | ................ E21B 31/20 |
| | | | | 248/230.2 |
| 8,166,620 B2 | * | 5/2012 | Halstead | ............... F16B 7/1409 |
| | | | | 403/322.2 |

FOREIGN PATENT DOCUMENTS

| | | | |
|---|---|---|---|
| GB | 579838 A | * | 8/1946 |
| GB | 2424684 A | | 10/2006 |
| GB | 2522984 A | | 12/2015 |
| GB | 2536075 A | | 9/2016 |
| JP | 4-105295 A | | 4/1992 |
| JP | H06-008084 A | | 1/1994 |
| KR | 10-2015-0052156 A | | 5/2015 |
| WO | 2004/055394 A1 | | 7/2004 |
| WO | 2006/109065 A1 | | 10/2006 |
| WO | 2008/085700 A2 | | 7/2008 |
| WO | 2010/038056 A2 | | 4/2010 |
| WO | 2017/068343 A1 | | 4/2017 |

\* cited by examiner

CONNECTOR

CROSS-REFERENCE TO RELATED APPLICATION

The present application is a national phase entry under 35 U.S.C. § 371 of International Application No. PCT/GB2016/053247, filed Oct. 19, 2016, entitled "CONNECTOR," which designates the United States of America, which claims priority to GB Application No. 1518829.5, filed Oct. 23, 2015, and GB Application No. 1601087.8, filed Jan. 20, 2016, the entire disclosures of each of these applications are hereby incorporated by reference in their entireties and for all purposes.

TECHNICAL FIELD OF THE INVENTION

The present invention relates to connectors, in particular subsea connectors and especially subsea connectors for connecting cables to power generation apparatus, such as offshore wind turbines. The invention also relates to methods of connection and removal of such connectors.

BACKGROUND TO THE INVENTION

Power is collected from offshore wind driven turbine generators by electric cables. The cables are connected at one end to a support pillar of the generator, and pass through an aperture in the wall of the support pillar or "pile" out to the sea bed. The cables tend to pass through the (substantially vertical) wall of the pile at an oblique angle. An exemplary connector for connecting cables to wind turbines is disclosed in WO2010/038056, which has a series of wedge-shaped latches, which latch onto the oblique inside edge of the aperture through the support pillar. In the arrangement of WO2010/038056, the latches are resiliently biased outwards, towards the engaged position. Because they are wedge-shaped, and suitably oriented, as the connector is pushed/pulled through the aperture, they pivot inwardly, then once each entire latch passes through the aperture, the resilient bias causes them to pivot outwardly to the engaged position. This creates a strong connection.

Whilst installation of the device of WO2010/038056 is easy, there is no mechanism for removing the connection device, as may be required for disassembly/maintenance. Disconnection would require divers (with the associated cost and risk) and destruction of the device.

The present invention seeks to provide an improvement on the device of WO2010/038056, however, it will be understood that the connector of the invention may be suitable for connection of other subsea elements, such as umbilicals and risers, especially, but not exclusively, where connection is at an oblique angle. The invention may also have application outside the subsea environment.

SUMMARY OF THE INVENTION

According to a first aspect of the invention there is provided an elongate connector having a longitudinal axis, a plurality of locking elements arranged on ramp surfaces and held in a plurality of cages on the connector, whereby the cages are moveable to move the locking elements along the ramp surfaces between an engaged position and a disengaged position; characterised in that the plurality of cages are moveable independently of each other.

Provision of locking elements which move between the engaged and disengaged position based on the movement of a cage, allows for manipulation of the cages to move the locking elements between locked and unlocked positions. Accordingly, retraction of the cages can move the locking elements to the disengaged position so as to allow disconnection of the connector without the use of divers, or destruction of the device.

The ramp surfaces may comprise a transition surface from a lower region, where the locking elements lie in the disengaged position to an upper region where the elements lie in the engaged position. The upper region and/or the lower region may be ramped, alternatively, the upper region and/or the lower region may be flat surfaces, parallel to the cages. As a further alternative, the upper region and/or the lower region may be formed as depressions. Forming the upper region in particular as a flat surface, or especially as a depression reduces the chances of accidental movement from the engaged position to the disengaged position.

The cages may be moveable axially.

The ramp surfaces may taper axially, so as to be deeper at the rear than at the front.

A plurality of ramp surfaces may be provided by a single ramp extending circumferentially around the connector.

The locking elements may be rolling elements, such as balls. Alternatively, for example, rollers could be used as rolling elements.

The locking elements may move radially outwardly from the disengaged position to the engaged position. The locking elements may move axially up the ramp surfaces as they move radially. The connector may be a male member, inserted in use into a female member. The female member may take the form of an aperture, such that the locking elements engage with the edge of the aperture.

Alternatively, the connector may be a female member and the locking elements may move inwardly from the disengaged position to the engaged position.

The cages may be resiliently biased towards the engaged position.

The resilient bias may be provided by a spring, e.g. a helical spring or a rubber spring, or a gas strut, such as a nitrogen gas strut.

The cages may be independently resiliently biased.

The plurality of locking elements and the plurality of cages may comprise at least three locking elements and at least three cages; and at least two of the cages may be operatively connected to move simultaneously, but independently of at least one other cage.

The plurality of locking elements and the plurality of cages may comprise at least four locking elements and at least four cages; and at least two of the cages may be operatively connected cages, which move simultaneously, but independently of at least two other independent cages and the at least two other independent cages may move independently of each other and independently of the operatively connected cages.

The plurality of locking elements and the plurality of cages may comprise at least six locking elements and at least six cages; and at least three of the cages may be operatively connected cages, which move simultaneously, but independently of at least three other independent cages and the at least three other independent cages may move independently of each other and independently of the operatively connected cages.

The plurality of locking elements and the plurality of cages may comprise at least eight locking elements and at least eight cages; and at least four of the cages may be operatively connected cages, which move simultaneously, but independently of at least four other independent cages and the at least four other independent cages may move independently of each other and independently of the operatively connected cages.

The arrangement of operatively connected cages and independent cages may alternate around the connector.

The locking elements may be arranged in at least one row spaced circumferentially around the connector.

The connector may have a front and a rear. The locking elements may be arranged in a forward row and a rearward row. The cages may extend fore and aft and be movable axially.

The locking elements in the rows may be circumferentially offset, the circumferential offset may be such that circumferentially between each locking element in the forward row and the next element in that row, there is an element in the backward row.

The resilient bias may bias the cages forwardly.

The arrangement of operatively connected cages and independent cages may alternate around the connector in such a way that the locking elements retained in the operatively connected cage form a forward row and the locking elements retained in the independent cages for a rearward row.

When entering an aperture at an oblique angle, there is a likelihood that one or more locking elements in a rearward row may be arranged abutting the internal surface of the aperture, i.e. neither outside its outside edge, nor past its inside edge. An element trapped against the internal surface of the aperture remains in the disengaged position, not able to move along the ramp into the engaged position. Consequently, the independence of the cages which hold the locking elements is most important in respect of the rearward row, which is more likely to become stuck abutting the internal surface.

The connector may comprise a release means operatively connected to the cages and operable to move the cages from the engaged position to the disengaged position.

The release means may be a collar. The collar may be connected to the cages by pins. The collar may be provided to the rear of the cages and the pins may extend through the rear of the collar. The pins may be provided with extensions, such as flanges, such that rearward motion of the collar causes the pins to move rearward, moving the cages rearward and hence moving the locking elements to the disengaged position, but rearward movement of the cage simply causes the pins to extend through the release collar without moving the release collar.

The release means may be operable by an ROV (remotely operated underwater vehicle). Alternatively, the connector may be provided with a mechanism for remotely operating the release means, for example a hydraulically operated ram, a horseshoe clamp, or another actuator, such as a screw and thread, operable (when turned by an ROV or diver) to move the collar rearward.

The operatively connected cages may be operably connected by fixed attachment to the release means. Consequently, a visual indication of movement of the operably connected cages may be determined from outside the connector by viewing the motion of the release means. Additional flanges may be provided on the pins of the operably connected cages which interact with the front of the collar, so as to move the collar in tandem with the operably connected cages.

As an alternative to having cages which are operably connected to one another by connection to the release means, the cages may each move independently, but at least one cage may be fixedly connected to the release means. Thus, the same visual indication can be seen when that particular cage moves back and forth.

The connector may comprise a hollow body upon which the cages and locking elements are mounted. The collar, pins and/or resilient biasing means may also be mounted on the hollow body. The ramps may be formed in the hollow body.

The connector may comprise a nose section comprising means for connection to an elongate member, such as a bend stiffener or bend restrictor to avoid overbending of a cable which extends through, and out of the hollow body.

The connector may comprise an elongate member, such as a bend stiffener or bend restrictor connected to the nose section.

The connector may comprise a tail section comprising means for connection to a bend stiffener to avoid overbending of a cable extending into the rear of, and through, the hollow body.

The connector may comprise a housing having a frustoconical stop face arranged to abut a support pillar. The housing may house the resilient biasing means. The cages may be slidable into and out of the housing. The pins may extend through the rear of the housing.

The connector may be a subsea connector.

The connector may be a subsea connector for connecting subsea cables to generators, e.g. wind turbine generators.

A second aspect of the invention provides an elongate connector having a plurality of locking elements arranged on ramp surfaces and held in at least one cage on the connector, whereby the at least one cage is moveable to move the locking elements along the ramp surfaces between an engaged position and a disengaged position; characterised by a sleeve arranged radially of the cage and having slots therein, whereby the locking elements move radially through the slots from the disengaged position to the engaged position.

The provision of a sleeve over the movable cages prevents resistance between the cages and an aperture (or the like) that the connector is engaging with from acting against the movement of the cages to the engaged position.

The slots may extend axially and the locking elements move axially as they move radially through the slot.

The slots may be shaped to retain the locking elements in the connector.

The width of at least part of the slots (e.g. their radially outer region) may be less than the width of the locking elements. This arrangement separates the function of restricting radial movement from the function of the cages in determining axial movement of the locking elements.

A third aspect of the invention provides an elongate connector having a plurality of locking elements arranged on ramp surfaces and held in at least one cage on the connector whereby the at least one cage is movable to move the locking elements along the ramp surfaces from a disengaged position to an engaged position; the locking elements being movable in the at least one cage to a further, detach position.

This provision of an additional "detach" position, allows for permanent detachment without movement back to the disengaged position, which can be more easily achieved, for example by use of a pull-in and/or retraction head, rather than an ROV The locking elements may move in the same radial sense from the engaged position to the disengaged position and from the engaged position to the detach position.

The locking elements may move radially inwardly from the engage position to the disengaged position, and from the engaged position to the detach position.

The locking elements may move in the same axial sense from the disengaged position to the engaged position and from the disengaged position to the detach position.

The at least one cage may be operatively connected to part of the connector, so as to restrict the motion of the locking elements to the engaged and disengaged positions, the operative connection being breakable so as to allow movement to the detach position.

The at least one cage may be operatively connected to a release collar.

The operative connection may be frangible. A predetermined force may be required to break the operative connection. The predetermined force may be at least 50,000N or at least 100,000N.

A tension bolt, tension pin, shear bolt, shear pin or the like may provide the breakable operative connection.

Obviously embodiments may comprise the features of the first and second, first and third, second and third or first to third aspects of the invention including any combination of optional features According to a fourth aspect of the invention, there is provided a method of connecting a subsea cable to a generator comprising attaching a cable to a connector according to the first aspect of the invention and pulling the cable through an aperture in a pillar, or into a female connector having a ridge behind which the locking elements may engage, such that locking elements within cages move from a disengaged position to an engaged position.

In the method, the female connector may be a guide cone in a J-tube, the J-tube having an edge with at least one internal flange. The flange presents a "false edge" equivalent to the edge of an aperture, behind which the locking elements engage In the method, the aperture may be at an oblique angle.

The locking elements may be arranged such that at least one element from the forward row and at least one element from the rearward row engage with the edge of the aperture at an oblique angle in the support pillar.

The locking elements may be arranged such that either two elements from the forward row and one from the rearward row engage with the edge of the aperture, or two elements from the rearward row and one from the forward row engage with the edge of the aperture. This arrangement whereby there are always three points of contact on the inside edge of the aperture creates a stable connection.

A fifth aspect of the invention comprises a method of disconnecting a subsea cable connected to a generator with a connector according to the first aspect of the invention; the method comprising moving the cages so as to move the locking elements from the engaged position to the disengaged position.

Preferably the connector comprises a release collar and the method comprises moving the release collar to move the cages, to move the locking elements from the engaged position to the disengaged position.

A sixth aspect of the invention provides method of disconnecting a subsea cable connected to a generator with a connector according to the third aspect of the invention comprising applying a predetermined force to force the connector out of an aperture thereby forcing locking elements from the engaged position to the detach position.

DESCRIPTION OF THE INVENTION

In order that the invention may be more clearly understood an embodiment thereof will now be described, by way of example only, with reference to the accompanying drawings, of which:

Figure 1:
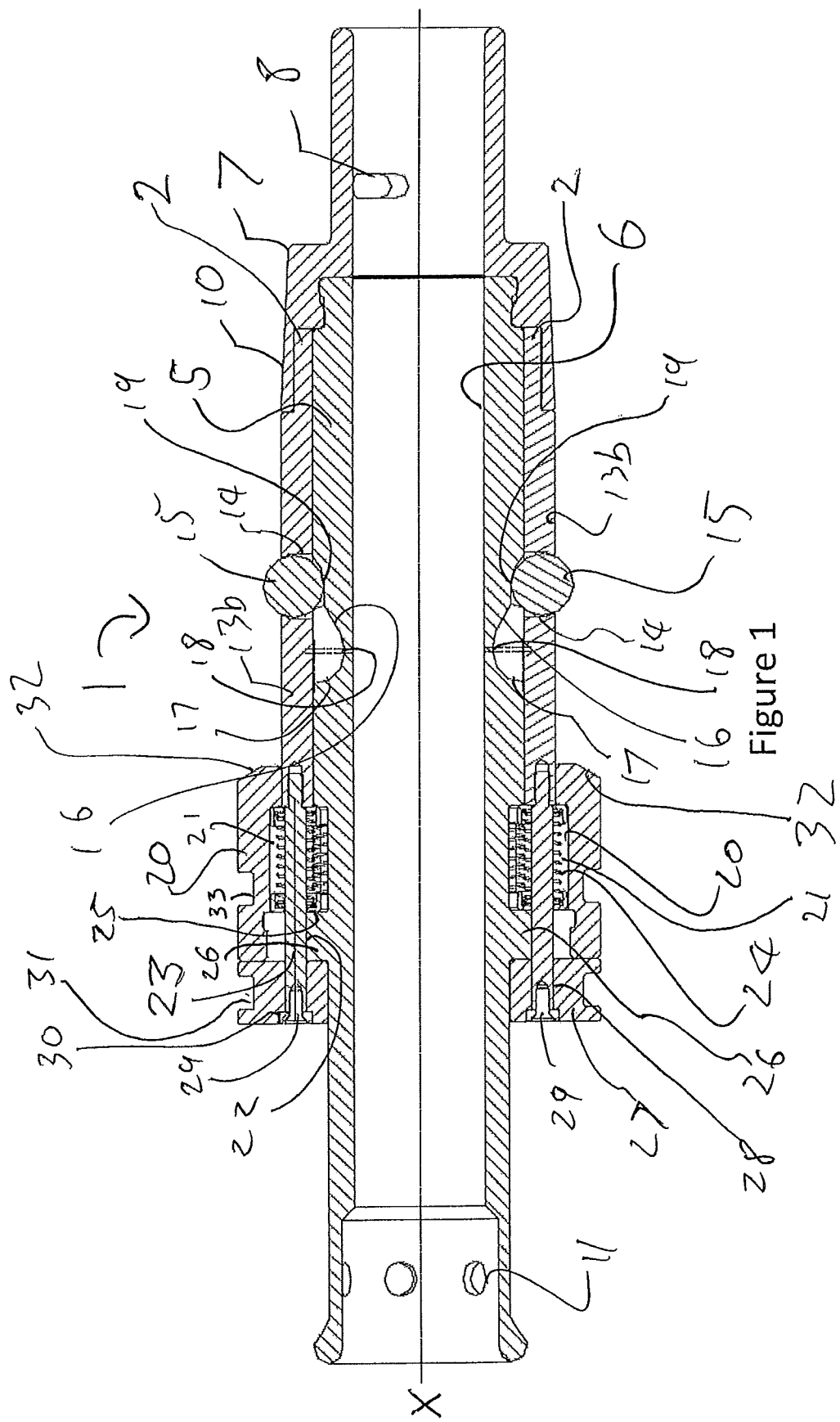
FIG. 1 is a lateral cross section through a connector according to a first embodiment of the invention.
Figure 2:
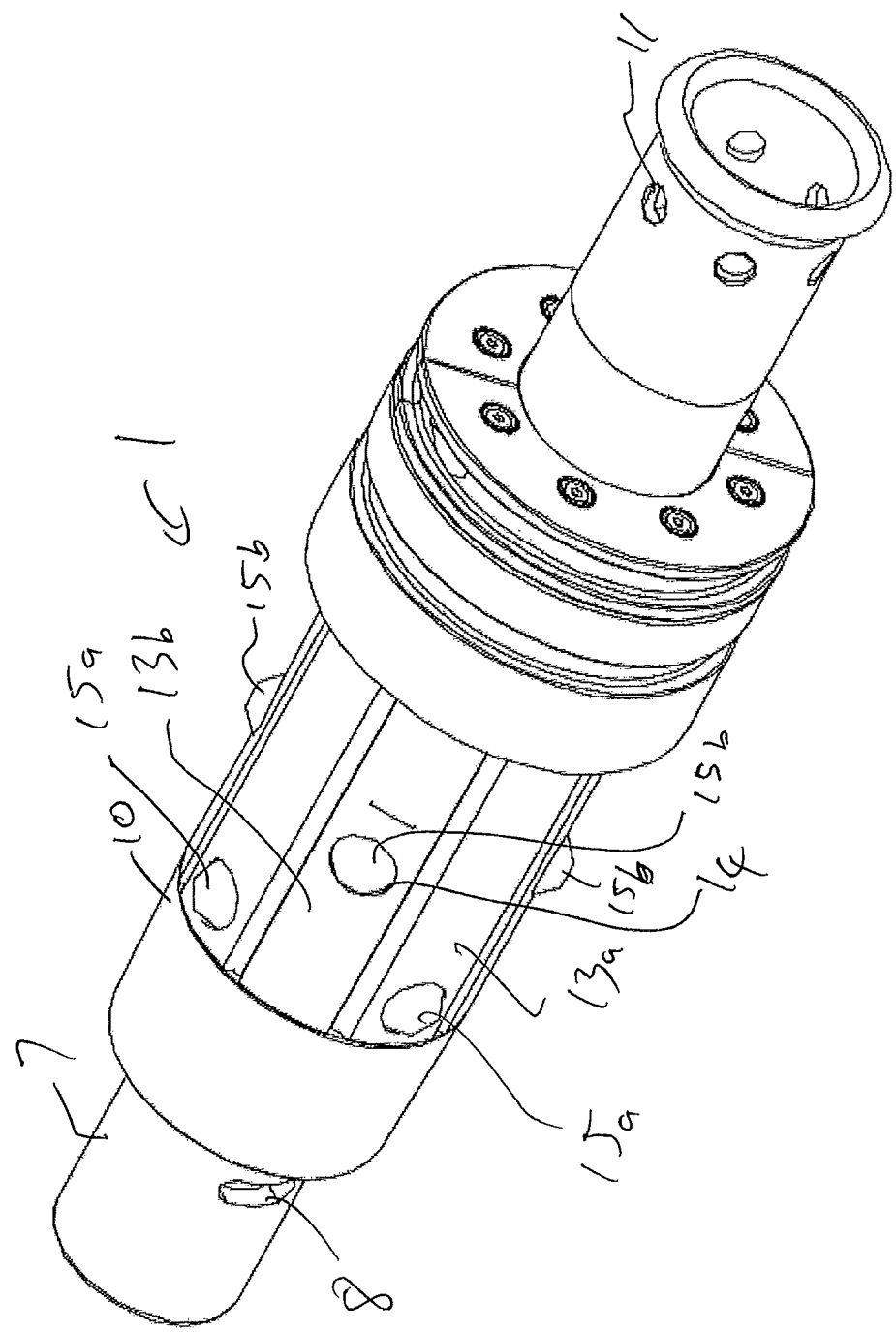
FIG. 2 is a rear isometric view of the connector of FIG. 1.
Figure 3:
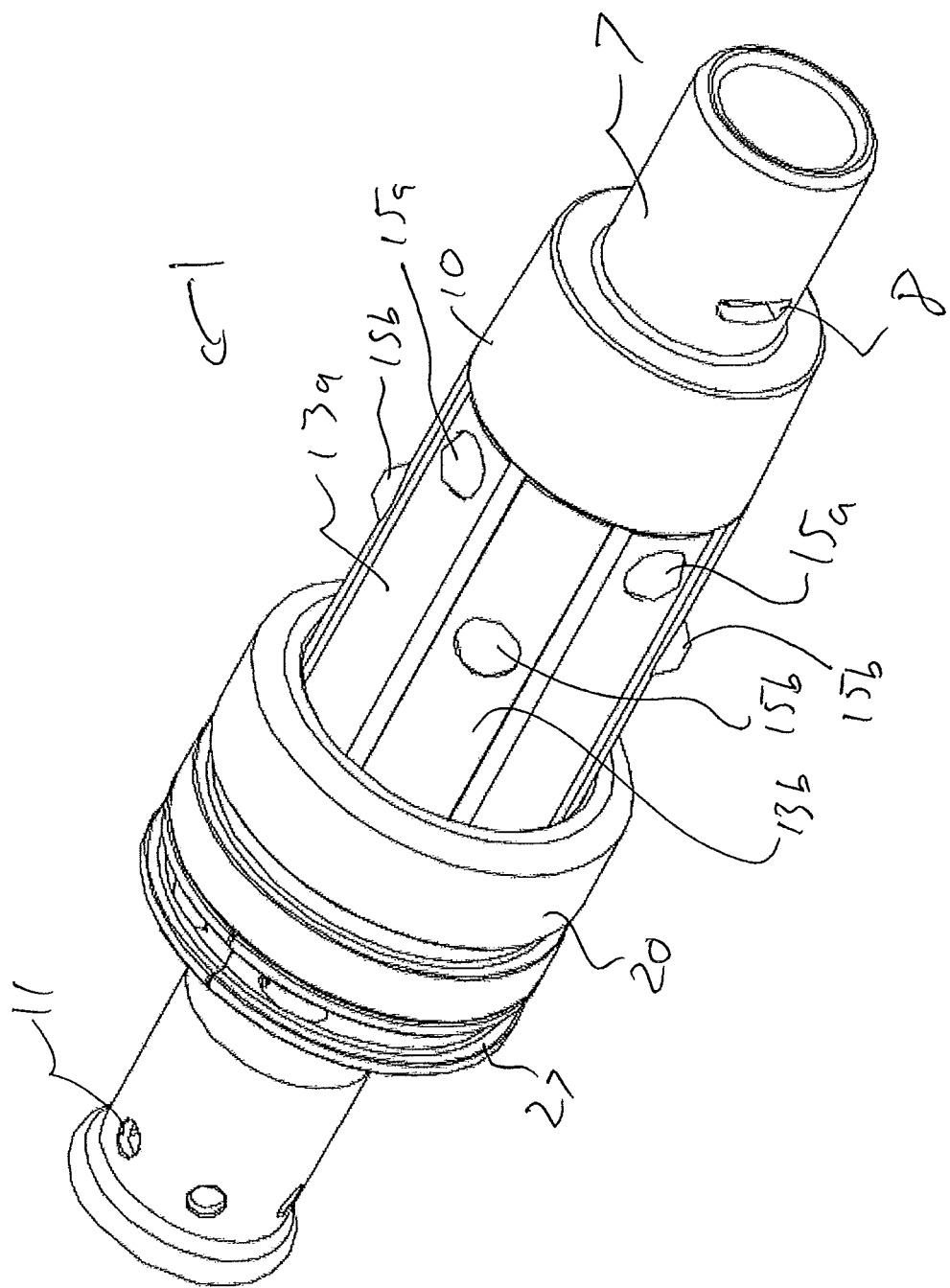
FIG. 3 is a front isometric view of the connector of FIGS. 1 and 2.
Figure 4:
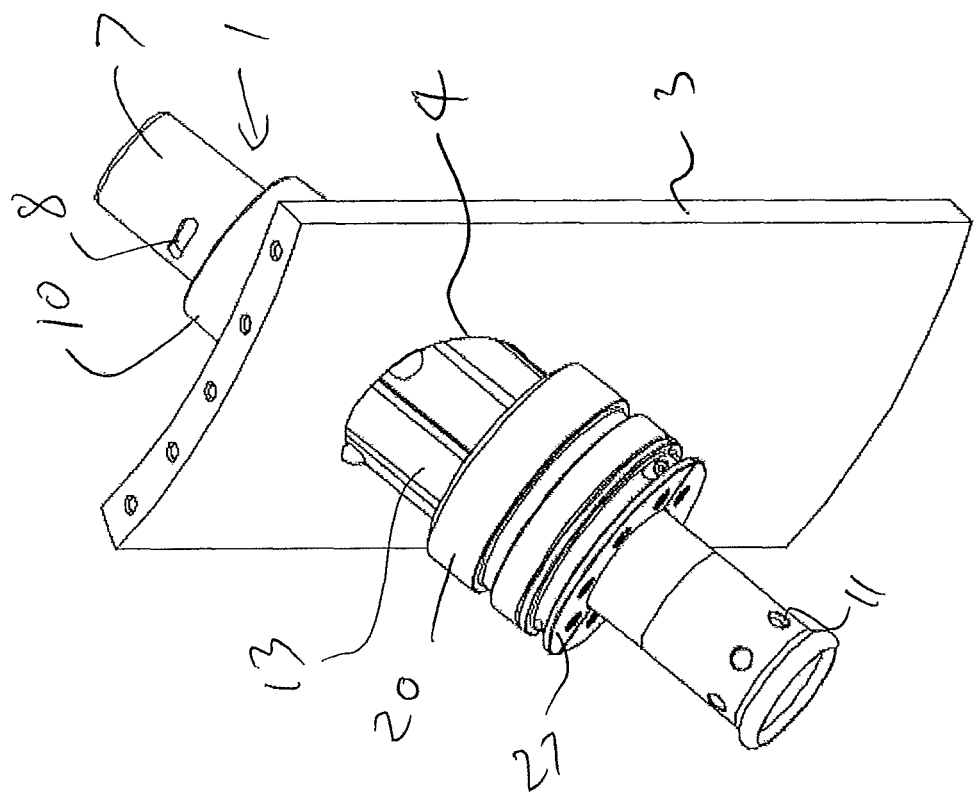
FIG. 4 is a rear isometric view of the connector of FIGS. 1 to 3 inserted into the aperture of a support pillar, the latter shown part-cutaway.
Figure 5:
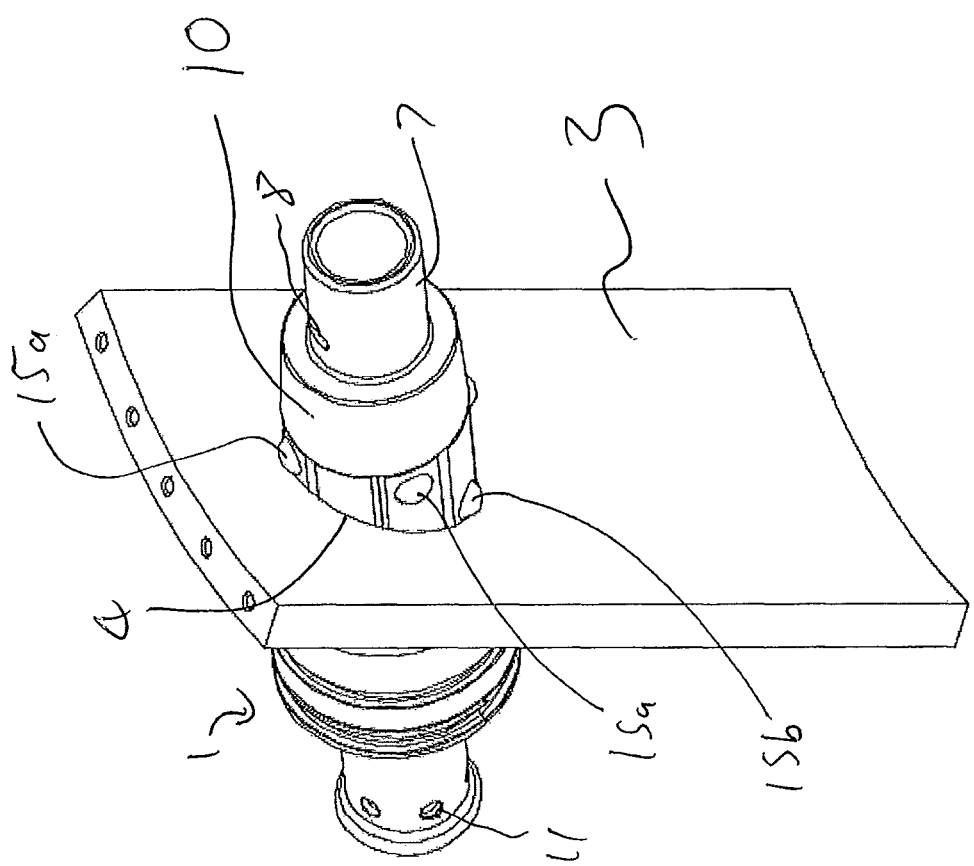
FIG. 5 is a front isometric view of the connector of FIGS. 1 to 3 inserted into the aperture of a support pillar, the latter shown part-cutaway.

Referring to FIGS. 1 to 12, there is shown a first embodiment of a subsea connector 1 for use in connecting a cable (not shown) to the support pillar 3 of a wind turbine generator (shown in FIGS. 4 to 7).

The connector 1 is a male member arranged to be inserted into a female member, in the form of an aperture 4, which extends at an oblique angle through the support pillar 3. In an alternative (not shown), the connector could extend into a specially adapted J-tube formed with a flange behind (inward of) the guide cone, which acts as the aperture.

The connector 1 comprises a hollow, load-bearing mandrel 5, through which a cylindrical bore 6 extends axially, along the primary (longitudinal) axis X of the connector 1. The bore 6 is intended to receive the cable (not shown), such that the connector 1 can connect the cable (not shown) to the support pillar 3. Those skilled in the art will appreciate that by altering the size of the bore 6, other subsea elements, such as risers or umbilicals could be connected with a connector 1 of the same type.

The mandrel 5 has a front and a rear. At the rear, connection means 11 is provided for connection to a bend stiffener 12, or the like. At the front, a nose cone 7 is attached to the mandrel 6 at the front of the nose cone 7 extends forward of the mandrel 5 continuing the bore 6, through which the cable (not shown) extends in use. On the outside of this forwardly extending part of the nose cone, a pair of slots 8 are formed. To which a forwardly extending bend-restrictor 9 (shown in FIGS. 6 and 7) is attached, to guide the cable within the support pillar 3.

The rear of the nose cone 7 includes a sleeve 10 concentric with, and spaced radially outward of the mandrel 5, towards its front. Thus, an annular gap is provided between the sleeve 10 of the nose cone 7 and the outer cylindrical surface of the mandrel 5. This annular gap provides a guide, into which the forward ends of cages (or ball cage segments) 13 extend. The cages 13 are formed as segments of a cylindrical tube, arranged side by side around the mandrel 5 and each extending along the longitudinal axis.

The front ends of the cages 13, are stepped, to form projections 2 which extend into the annular gap and are of reduced thickness relative to the main body of the cages, such that as a whole, the array of cages 13 has an inner diameter which corresponds to the outer diameter of the mandrel, and the outer diameter of the array of cages corresponds to the outer diameter of the sleeve 10 of the nose cone. On the other hand, the projections 2 at the forward ends of the cages have an inner diameter equal to the main bodies, but an outer diameter which corresponds to the inner diameter of the sleeve. Thus the array of cages 13 can slide freely fore and aft, restrained by the sleeve 10. In this embodiment eight cages 13 are provided, each having a single aperture 14 therethrough. Each aperture 14 is sized and shaped so as to capture a locking element in the form of a locking ball 15 in such a way that a portion of the ball 15 can extend radially outward from the aperture 14, but cannot fully escape from the aperture 14. This is achieved by a slight reduction in the diameter of the aperture 14 at its radially outer region.

The cages 13 are split into two types, the first type 13a (shown in FIG. 12) have apertures 14 toward the front of the cage 13a; the second type 13b (shown in FIG. 1) have apertures 14 towards the rear of the cage 13b. The type of cage 13a, 13b alternates around the connector 1, such that where one ball 15 is in an aperture 14 towards the front of a cage 13a, its neighbours are in an aperture towards the rear of the cage 13b. Thus, two circumferential rows of balls 15 are formed; a row of forward balls 15a and a row of rearward balls 15b.

Because the types of cages 13a, 13b alternate, in addition to the rows of balls 15a, 15b being spaced longitudinally, the balls 15a in the front row are longitudinally offset relative to the balls 15b in the rearward row.

In order for the balls 15a, 15b to extend to the engaged/deployed position, in which they protrude radially from apertures 14 and retract to the disengaged/stowed position, in which they do not protrude, the mandrel, upon which the cages 13 are mounted, is provided with ramps 16 which are formed in grooves 17 in the outer surface of the mandrel, with axially tapering surfaces, along which the balls can 15 roll. In the present embodiment, individual grooves 17 are provided for each ball 15. However, as an alternative, a pair of circumferentially extending grooves 17 could be formed around the entire circumference of the mandrel 5, one corresponding to the rearward set of balls 15b and the other for the forward row of balls 15a.

The grooves 17 are formed with the ramp 16 in the form of a transition surface from a lower region 18 (of smaller diameter), where the locking elements lie in the disengaged position to an upper region 19 (of greater diameter) where the elements lie in the engaged position. The upper regions 19 of the grooves 17 are formed as flat surfaces, parallel to the cages 13, but could take the form of depressions, to help maintain the deployed balls 15 in the engaged position.

The rear of the cages 13 is held within a tubular housing 20 which has a frustoconical forward end or "stop" 32. A series of cavities 21 are formed around the connector 1 between the tubular housing 20 and the mandrel 5, one cavity 21 aligned with each cage 15. The cavities 21 are formed by a recess in the tubular housing 20 and a corresponding recess/groove in the mandrel 5. Each cage 15 can slide rearward into its corresponding cavity 21. At the rear of each cavity 21, an aperture 22 is provided, through which a rod/pin 23 connected to the rear of each respective cage 15 can extend. Around the rod 23, connected near its forward end, is a spring element, in the form of a helical compression spring 24. A stop surface 25 is provided by a radially outwardly extending flange 26 formed in the mandrel 5, which forms part of the rear wall of the cavity 21. The helical spring 24 is also held in position at its rear by connection to the tubular housing 20.

Each spring element 24 resiliently biases the respective rod 23 (and hence the respective cage 13) forwards. Accordingly, the bias urges the balls 15 up the ramp surface 16 to the engaged position in the upper regions 19 of the grooves 17. To the rear of the flange 26, release means in the form of a release collar 27 is slidably mounted on the mandrel 5. The release collar 27 is provided with apertures/bores 28, corresponding to the apertures 22, which the rods 23 extend through. The apertures 28 through the release collar 27 are counterbored/countersunk at the rear, and the rods 23 are provided extensions in the form of flares at their rear, which extend into the countersink/counterbore 30. In this embodiment, the flares at the rear are provided by attaching a countersunk screw/bolt 29 to the rods 23.

This arrangement means that when the resilient bias of the spring elements 24 is overcome and individual cages 13 can move rearwards independently of each other, and as they do so, the rods 23 of the moving cages 13 slide out of the rear of the release collar 27.

Figure 12:
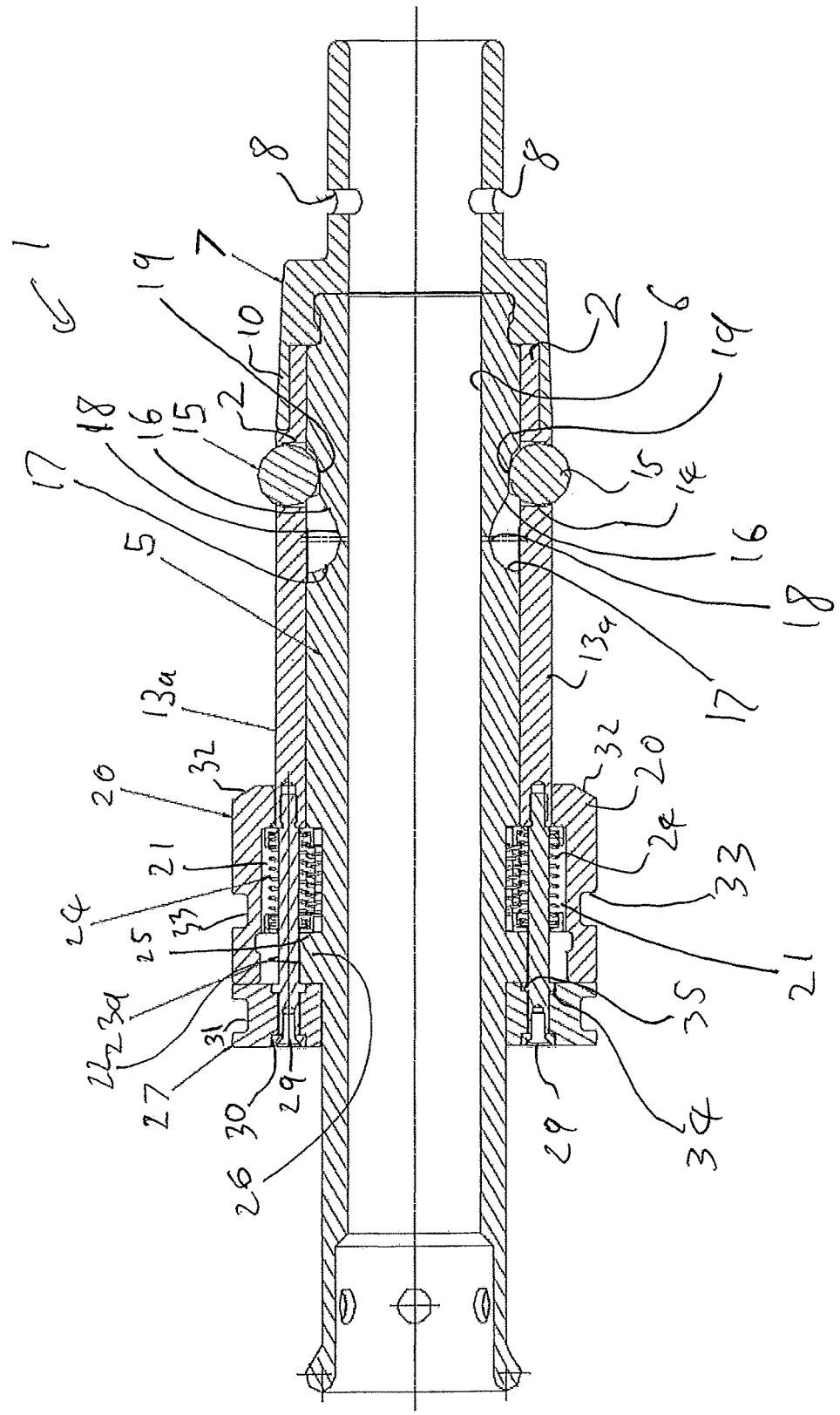
FIG. 12 is a lateral cross section of the connector of FIG. 1 taken at a different angle.
Figure 13:
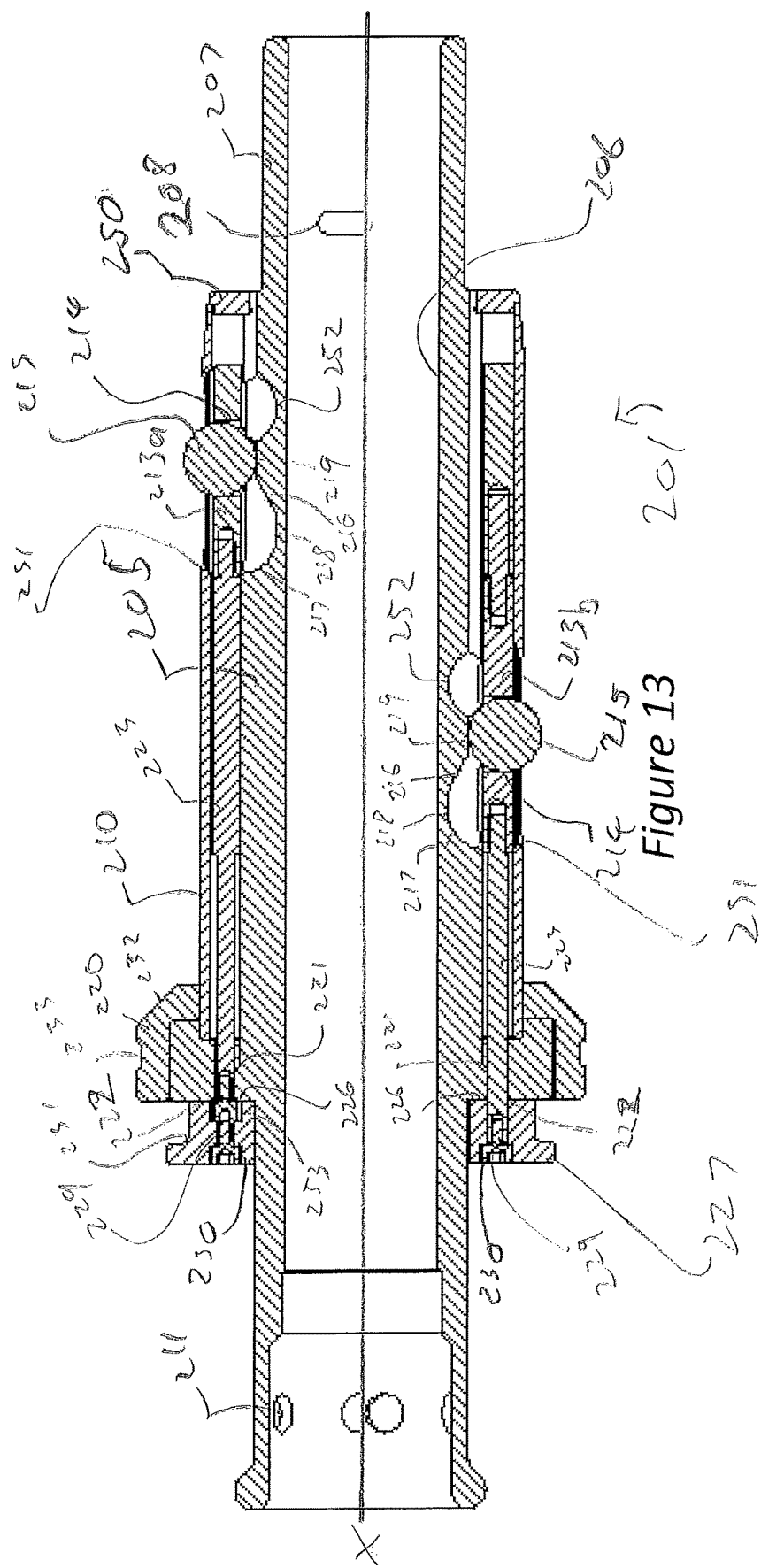
FIG. 13 is an section through a connector according to a second embodiment of the invention with locking elements in the engaged position, the section is towards line A-A in FIG. 17, such that the top half of the drawing is taken along an angle offset by 45 degrees to the bottom half of the drawing.

As shown in FIG. 12, the connection of the rods/pins 23a at the rear of the cages 13a of the first type is slightly different. Once again spring elements 24 are provided to bias respective rods 23a forwards and apertures/bores 28 are provided through the release collar corresponding to the apertures 22 through which the rods 23a extend. Again, the apertures 28 through the release collar 27 are counterbored at their rear and countersunk screws/bolts 29 are attached to the rods 23a such that rearward movement of the release collar moves the rods 23a (and hence cages 13a) rearward. However, the forward ends of the apertures 28 through the release collar 27 are also provided with counterbores 34 and the rods 23a are provided with integral flanges 35, which engage with the counterbores 34. Hence, the release collar 27 is effectively clamped between the flanges 35 and the flares of the countersunk/counterbored screws/bolts 29, such that movement of the release collar 27 and the cages 13a is in tandem; rearward movement of the cages 13a forcing the release collar rearward, in the same way that rearward movement of the release collar moves the cages 13a, 13b rearward.

In the operative position, the release collar 27 is mounted adjacent the rear of the flange 26, and the resilient bias of the springs 24 holds it in the operative position. However, as mentioned above, the collar 27 is mounted to be able to slide on the mandrel 5. The release collar 27 is provided with gripping means 31 in the form of a circumferential groove, and a similar gripping means 33 in the form of a circumferential groove is formed in the tubular housing 20. Consequently, a hydraulic horseshoe clamp (not shown) or similar actuator, mounted to the gripping means by ROV (remotely operated underwater vehicle) may be connected. Thus, the actuator can pull the release collar 27 rearwards, against the resilient bias, to a release position. Pulling the release collar 27 backwards, causes the pins/rods 23 to be pulled backwards (as a consequence of the flared ends of the screw/bolt 29), thus pulling the cages 13 rearward and allowing the balls 15 to move into the disengaged/stowed position.

In use, a cable (not shown) is threaded through the bore 6 of the mandrel 5 and attached to the connector 1 by conventional means. A bend restrictor 9 is then attached to the nose cone and a bend stiffener 12 is connected to the rear of the connector 1.

The front of the cable (not shown) extending out of the front of the connector is then pulled in to the support pillar 3 of a wind turbine generator (or the like), through the aperture 4 which extends at an oblique angle (e.g. 60 degrees) through the support pillar 3. As the cable is pulled in, the resilient spring elements 25 will be urging the cages 13 forwards and hence urging the balls 15 into the engaged position (radially outwards), as shown in FIGS. 1, 2, 3 and 5. Once the nose cone 7 begins to enter the aperture, because it is at an oblique angle, one or two of the balls 15a in the forward row will contact the outside edge of the aperture 4. The aperture 4 is normally angled downwards, so the lowermost balls 15a will contact the outside edge of the aperture 4 first.

As the cable (not shown) continues to be pulled into the support pillar 3, pulling the connector 1 inwards, the balls 15a which abut the edge, will be pushed rearwards, forcing the cages 13a, to which they are attached, backwards against the resilient bias of their respective springs 24. Because the cages 13a are operatively connected to one another by the release collar, the spring bias of all the cages must be overcome at once, so as to move the release collar rearwards as the balls 15a that are moving through the aperture 4 move backwards and inwards down the ramps 16.

As the connector 1 continues to move through the aperture, balls 15a in the upper region of the forward row will come into contact with the outside edge of the aperture 4 and move inwardly. Once all the balls in the forward row have passed through the aperture 4, the resilient bias of the helical springs 24 will force the cages 13a forward, moving the balls 15a forward, up the ramps 16 and outward into the engaged position shown in FIGS. 8 and 9. This forward motion of all the cages 13a with balls 15a in the forward row also brings the release collar forward providing a visual indication from outside the support pillar 3 that the first row of balls 15a have all passed the inside edge of the aperture.

Figure 8:
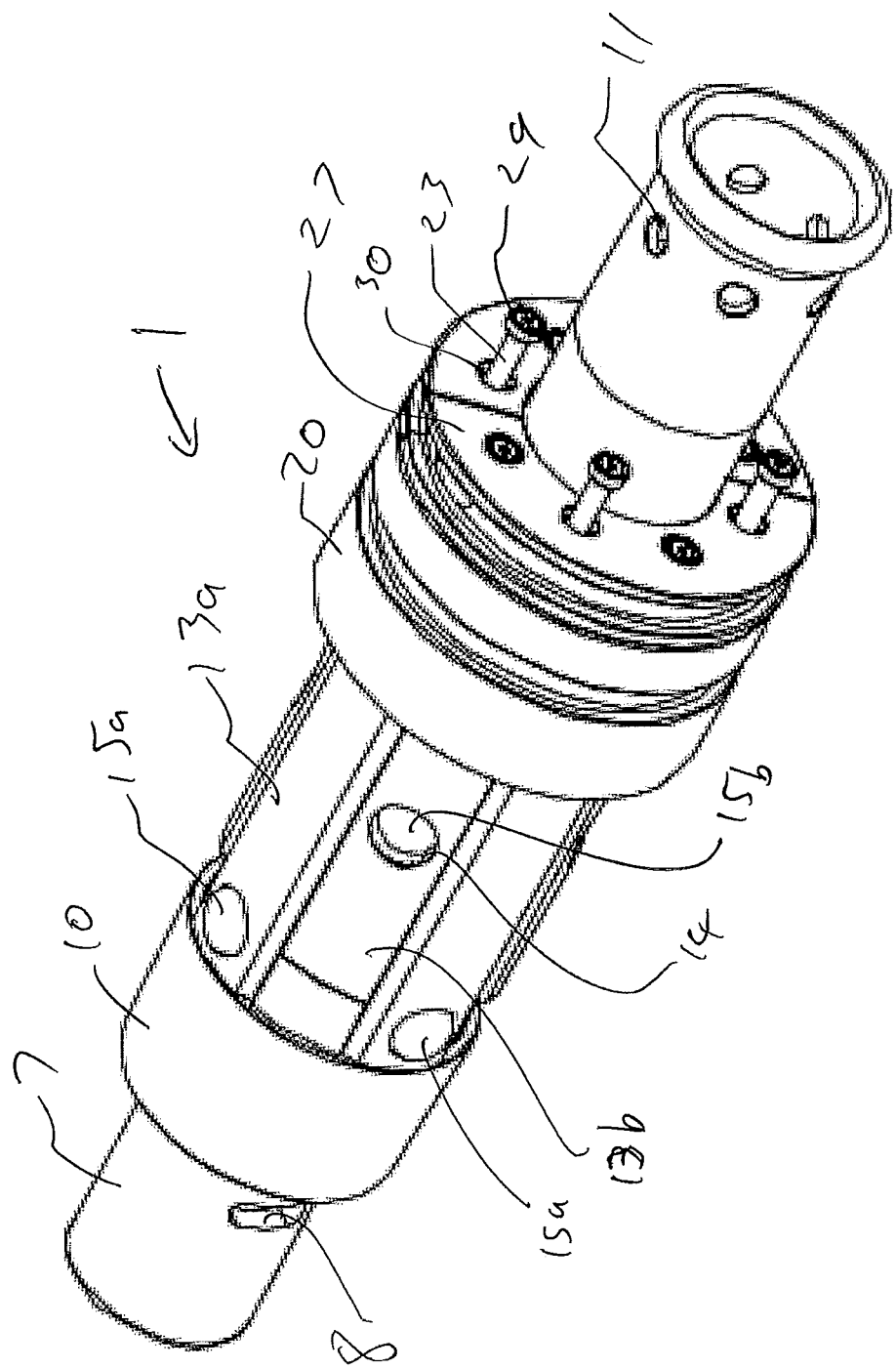
FIG. 8 is a rear isometric view of the connector of FIGS. 1 to 3 with some locking elements in the disengaged position.
Figure 9:
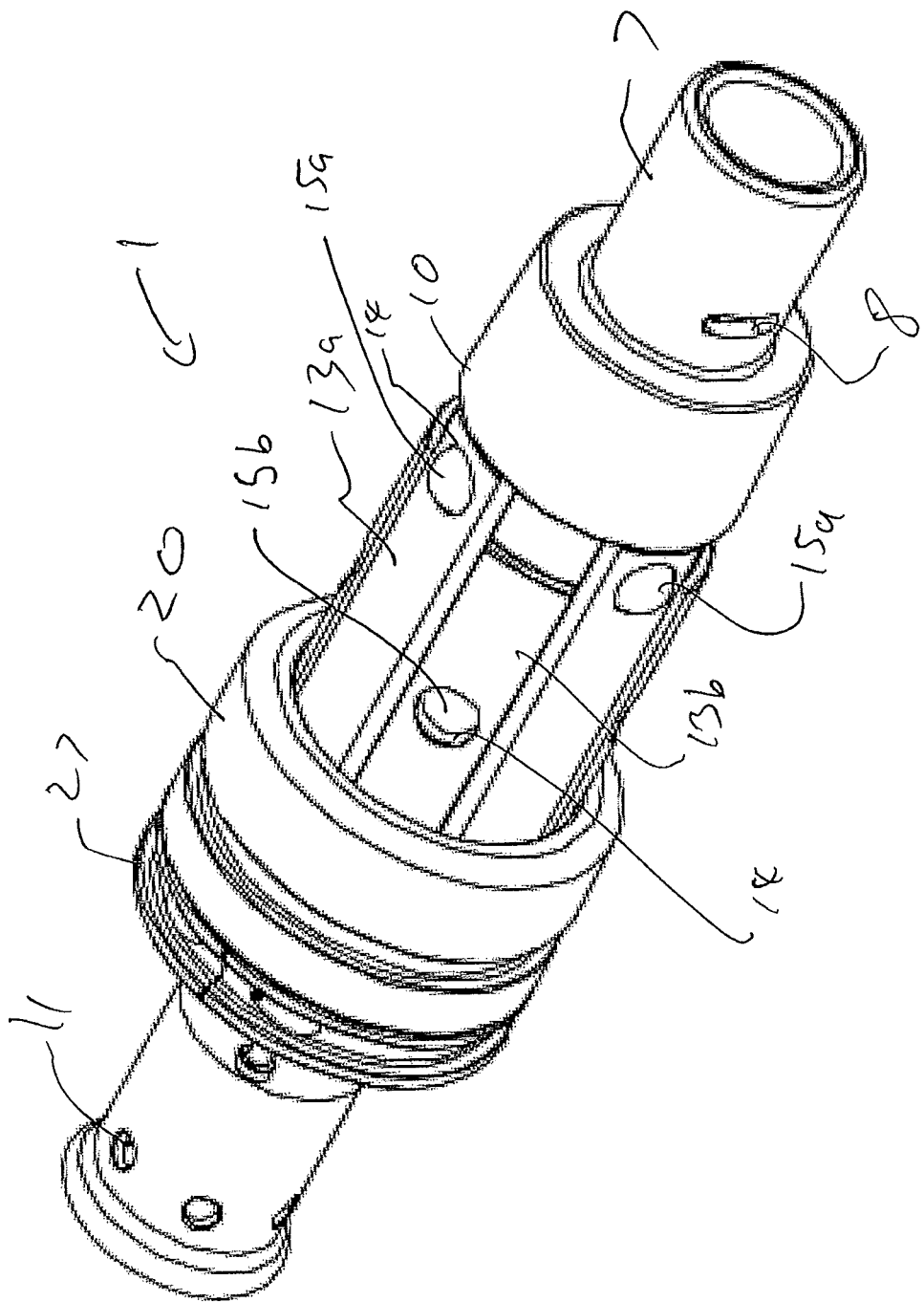
FIG. 9 is a front isometric view of the connector of FIGS. 1 to 3 with some locking elements in the disengaged position.

FIGS. 8 and 9 show the connector with all the forward balls 15a in the engaged position, having passed though the aperture 4 and the rearward balls 15b that are visible in the disengaged position, as would be the case after the forward balls 15a have passed through the inside edge of the aperture 4, but the rearward balls 15b are coming through the aperture, having been pushed backwards (and inwards) by the outside edge of the aperture 4. Depending on the angle of the aperture 4, some of the balls 15b in the rearward row, may remain within the aperture 4 (between its inside and outside edges) even once the connector 1 has been pulled in to its fullest extent, at which point the tubular housing 20 (in particular the frustoconical forward surface 32 thereof) will abut the wall of the support pillar 3 to prevent over-insertion.

Figure 6:
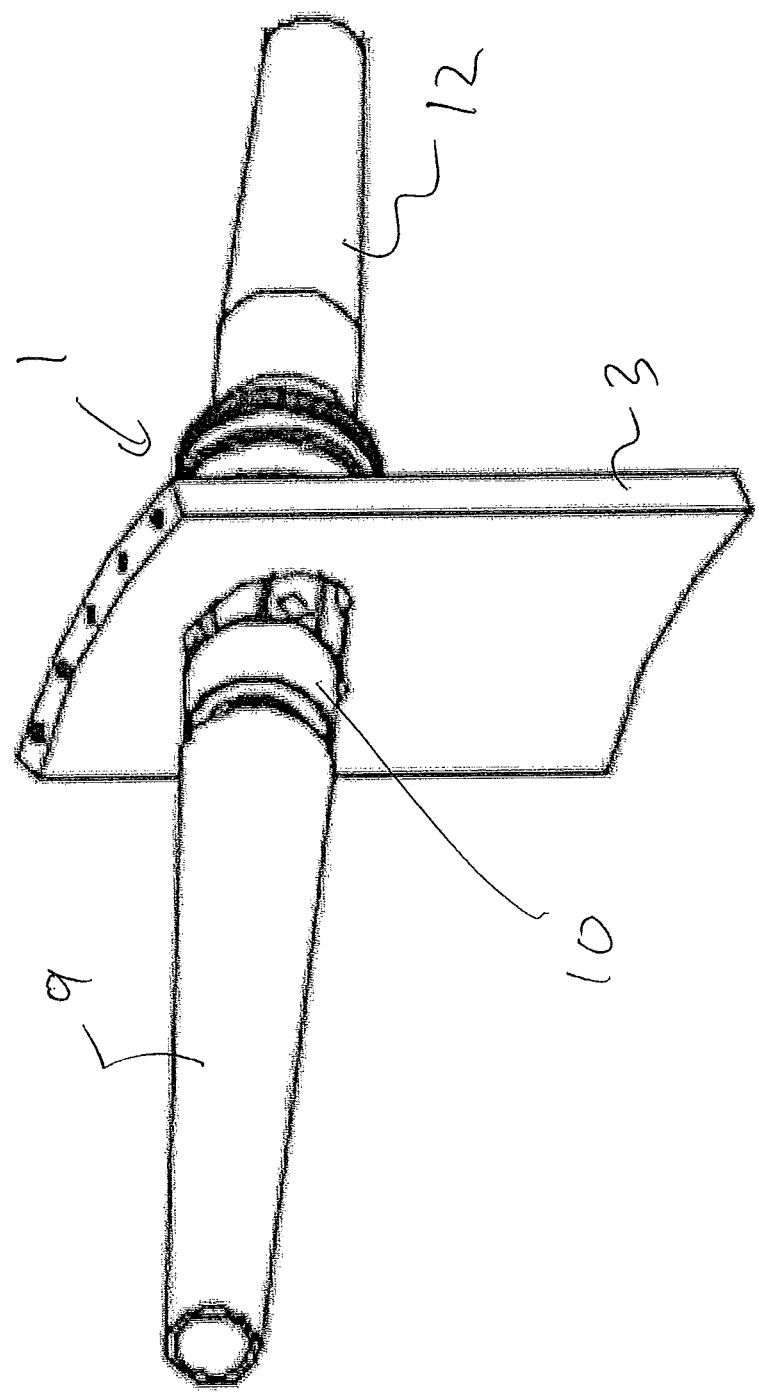
FIG. 6 is a front isometric view of the connector of FIGS. 1 to 3 attached to a bend restrictor at the front and a bend stiffener at the rear and inserted into the aperture of a support pillar, the latter shown part-cutaway.
Figure 7:
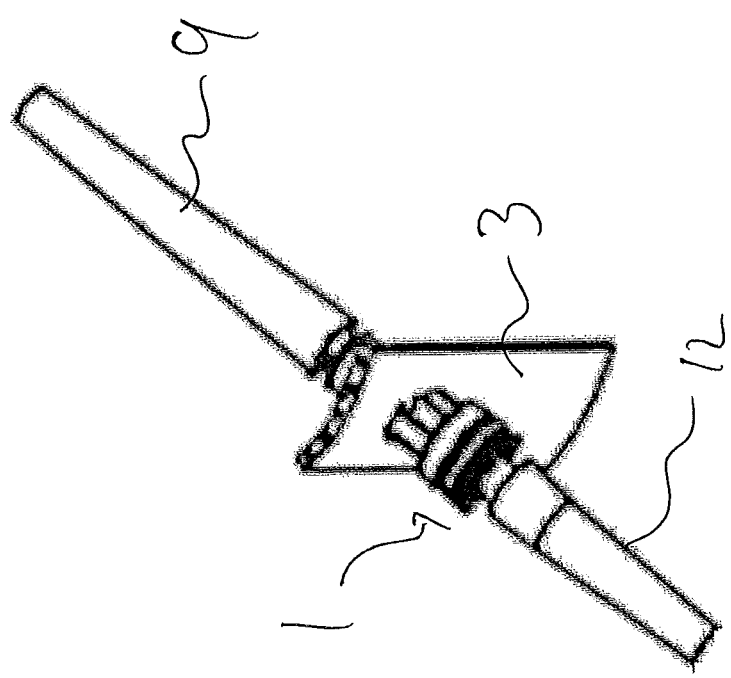
FIG. 7 is a rear isometric view of the connector of FIGS. 1 to 3 attached to a bend restrictor at the front and a bend stiffener at the rear and inserted into the aperture of a support pillar, the latter shown part-cutaway.

With a suitably angled and suitably thick support pillar 3 and appropriately spaced rows of balls 15, complete insertion of the connector 1 will lead to three balls 15 being inside the aperture in the engaged position, engaged with its inside edge and further balls 15a being inside the connector but not engaged with the edge, as well as further balls 15b being outside the aperture 4, taking no part in engagement. Depending on the orientation as the connector 1 is pulled through, the three balls 15 will either be two balls from the forward row of balls 15a and one from the rearward row of balls 15b, or two balls 15b from the rearward row and one from the forward row of balls 15a. This creates three points of contact on the inside edge of the aperture, providing a strong and stable connection as shown in FIGS. 6 and 7.

Once the balls 15 are engaged inside the inside edge of the aperture 4, the connector cannot be pulled out. This is because pulling the connector pulls the balls against the inside edge, creating a force on the balls downward (i.e. radially inward) and longitudinally forward. However, the grooves 17 are tapered such that the transition surface of the ramps 16 reduces in diameter in the longitudinally rearward direction. Accordingly, the balls 15 cannot be forced down the ramps 16 and the connector is securely connected to the support pillar 3.

The connector 1 could be connected to another female member, such as a J-tube (not shown), as mentioned above, provided a suitable modification was made, such as provision of a flange to replicate the aperture 4. The connector 1 could even connect to a J-tube with a flange that is not necessarily angled, but instead perpendicular to the rows of balls 15. Either, or both of the front or rear row of balls 15 could engage behind a flange.

Figure 10:
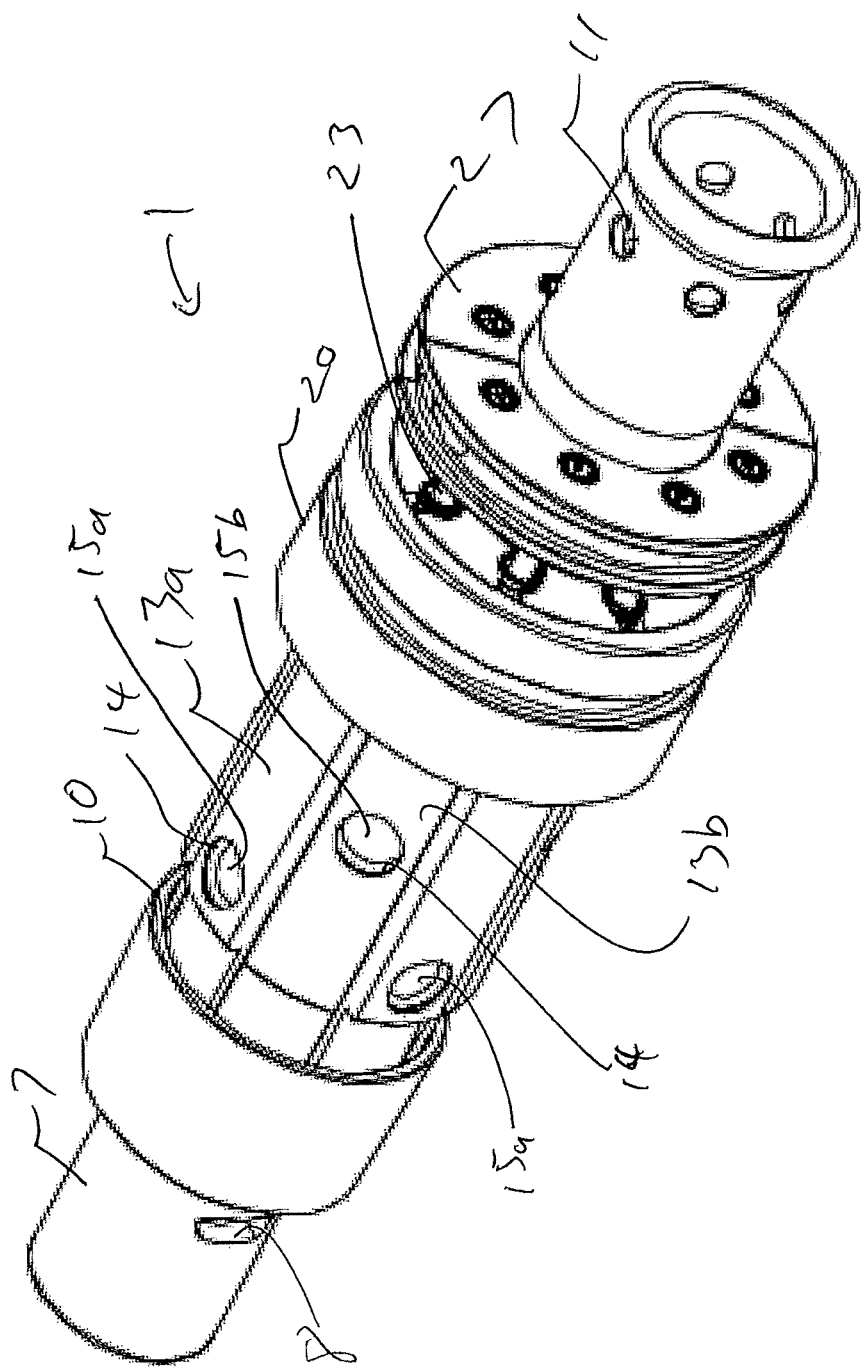
FIG. 10 is a rear isometric view of the connector of FIGS. 1 to 3 with all the locking elements in the disengaged position.
Figure 11:
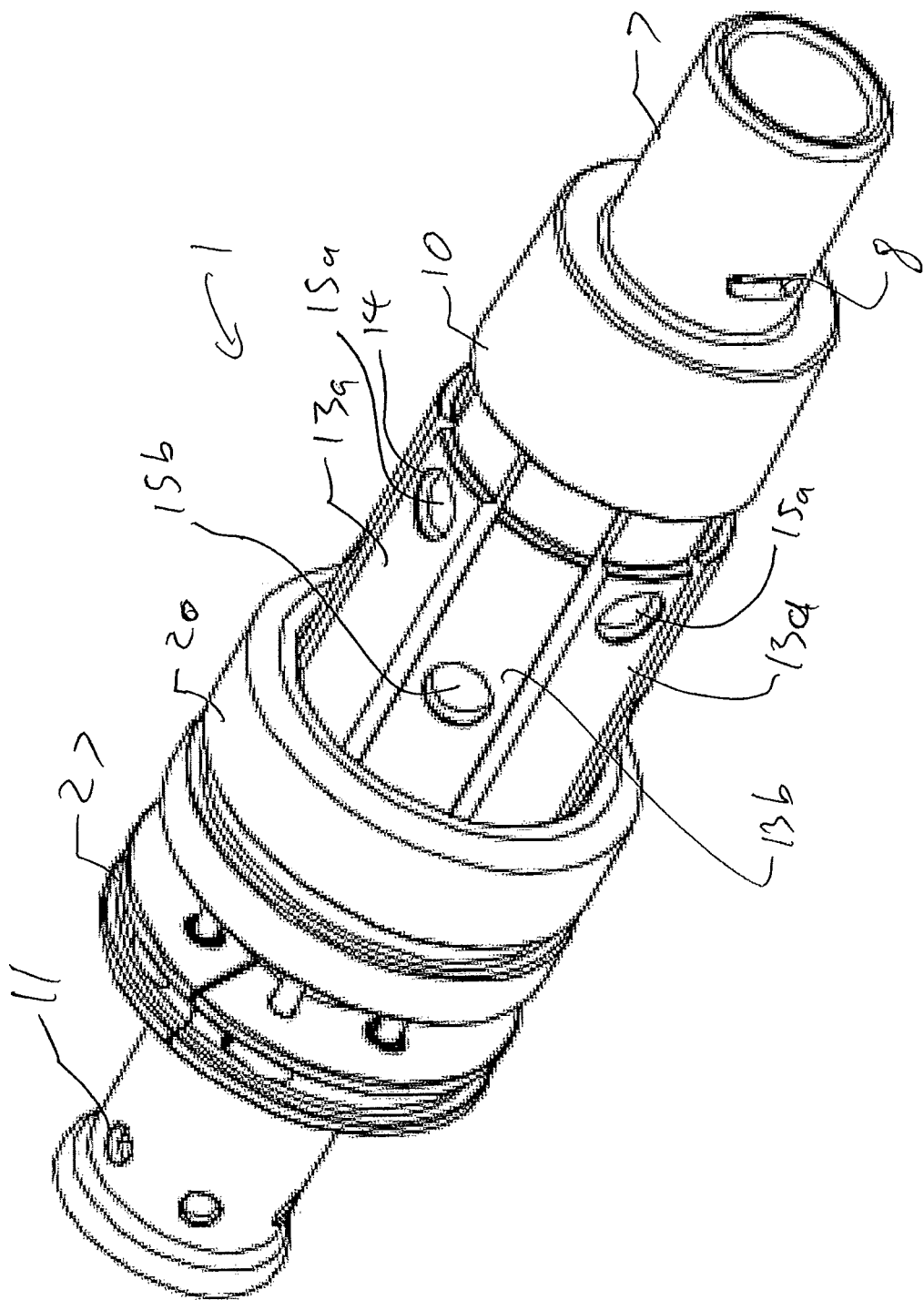
FIG. 11 is a front isometric view of the connector of FIGS. 1 to 3 with all the locking elements in the disengaged position.

To remove the connector 1 from an aperture 4 in a support pillar 3 (or other female member), the release collar 27 is pulled rearwards as shown in FIGS. 10 and 11 (e.g. by an actuator such as a horseshoe clamp). This rearward motion overcomes the resilient bias of all of the springs 24, and pulls all the rods 23 and cages 13a, 13b backwards—this in turn forces the balls 15 rearward and radially inward down the ramps 16 to the lower regions 18 of the grooves 17. With the balls 15 moved to this disengaged/stowed position, in which they are no longer urged radially outwardly, the connector 1 can be pulled out of engagement with the aperture 4 for maintenance/replacement etc. Once the release collar is no longer pulled apart from the tubular housing 20, the resilient bias of the springs 24 will bring it back into the operative position, adjacent the flange 26.

Referring to FIGS. 13 to 25, there is shown a second embodiment of a subsea connector 201 for use in connecting a cable (not shown) to the support pillar 203 of a wind turbine generator (shown in FIGS. 19 to 22).

The connector 201 is a male member arranged to be inserted into a female member, in the form of an aperture 204, which extends at an oblique angle through the support pillar 203. In an alternative (not shown), the connector could extend into a specially adapted J-tube formed with a flange behind (inward of) the guide cone, which acts as the aperture.

The connector 201 comprises a hollow, load-bearing mandrel 205, through which a cylindrical bore 206 extends axially, along the primary (longitudinal) axis X of the connector 201. The bore 206 is intended to receive the cable (not shown), such that the connector 201 can connect the cable (not shown) to the support pillar 203. Those skilled in the art will appreciate that by altering the size of the bore 206, other subsea elements, such as risers or umbilicals could be connected with a connector 201 of the same type.

The mandrel 205 has a front and a rear. At the rear, connection means 211 is provided for connection to a bend stiffener 212, or the like. At the front, a nose cone 207 is formed in the mandrel 206 at the front. The nose cone 207 extends forward of the mandrel 205 continuing the bore 206, through which the cable (not shown) extends in use. On the outside of this forwardly extending part of the nose cone, a pair of slots 208 are formed. To which a forwardly extending bend-restrictor 209 (shown in FIGS. 21 and 22) is attached, to guide the cable within the support pillar 203.

Figure 26:
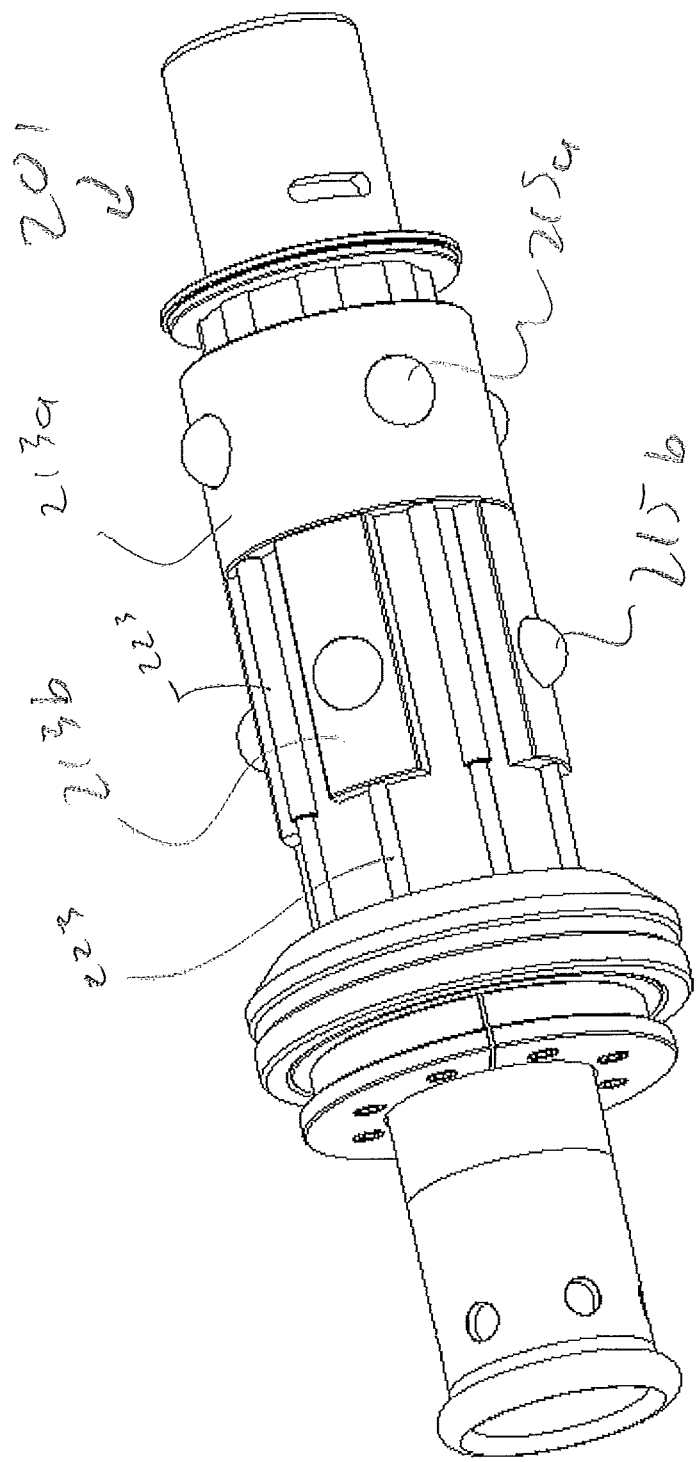
FIG. 26 is a rear isometric view of the connector of FIGS. 13 to 16 with the sleeve not shown.

The rear of the nose cone 207 is defined by a radially outwardly extending annular stop surface 250. A sleeve 210 concentric with, and spaced radially outward of the mandrel 205, is provided extending rearwardly from the annular stop surface. Thus, an annular gap is provided between the sleeve 210 and the outer cylindrical surface of the mandrel 205. This annular gap provides a guide, in which cages (or ball cage segments) 213 extend. As shown in FIG. 26, a front cage 213a, situated towards the front of the connector 201, is provided as a cylindrical tube, whereas rear cages 213b are formed as segments of a cylindrical tube, arranged side by side around the mandrel 205 and each extending along the longitudinal axis.

The array of cages 213 has an inner diameter which corresponds to the outer diameter of the mandrel 205, and the outer diameter of the array of cages corresponds to the inner diameter of the sleeve 210, so as to be slidable within the annular gap between the mandrel 205 and the sleeve 210. In this embodiment a single forward cage 213a is provided which includes four circumferentially spaced apertures 214 and four rearward cages 213b are provided, each having a single aperture 214 therethrough. The apertures are evenly spaced around the forward cage 213a and the rearward cages 213b are similarly evenly spaced, situated such that their apertures 214 are provided at 45 degrees to those of the forward cage 213a. Consequently where one ball 215 is in an aperture 214 towards the front of the connector 201, its neighbours are in an aperture 214 towards the rear of the connector 201. Thus, two circumferential rows of balls 215 are formed; a row of forward balls and a row of rearward balls. Of course, those skilled in the art could conceive of other angles for the balls, or indeed additional rows at other angles.

In addition to the rows of balls 215a, 215b being spaced longitudinally, the balls 215a in the front row are longitudinally offset relative to the balls 215b in the rearward row.

Each aperture 214 is sized and shaped so as to capture a locking element in the form of a locking ball 215 in such a way that a portion of the ball 215 can extend radially outward from the aperture 214, and freely move radially inward and outward, but is restrained in the axial (fore and aft) direction. The sleeve 210 is provided with a plurality of slots 251 corresponding in position to the region where the balls extend. The slots 251 extend axially, so as to allow the balls to move freely in the axial direction (fore and aft), in tandem with the cages 213a, 213b. However, the slots are shaped and sized to restrict movement in the radial direction, such that the balls 215 cannot fully escape from the sleeve 210. This is achieved by a slight reduction in the width of the slots 251 at their radially outer regions.

As set out above, the cages 213 are split into two types, the first type 213a have apertures 214 toward the front of the cage 213a; the second type 213b have apertures 214 towards the rear of the cage 213b. The plurality of second types of cage 213b, are spaced around the connector 201, and the cage of the first type sits in front of them.

In addition to the rows of balls 215 being spaced longitudinally, the balls 215a in the front row are longitudinally offset relative to the balls 215b in the rearward row. Since the balls in the forward cage 213a are axially restrained by the same component, they move in tandem with each other, as the cage 213a moves back and forth. On the other hand, the balls 215 in the cages 213b of the second type can move independently.

In order for the balls 215a, 215b to extend to the engaged/deployed position, in which they protrude radially from apertures 214 and slots 251 and retract to the disengaged/stowed position, in which they do not protrude from the slots 251, the mandrel 205, upon which the cages 213 are mounted, is provided with ramps 216 which are formed in grooves 217 in the outer surface of the mandrel 205, with axially tapering surfaces, along which the balls can 215 roll. In the present embodiment, individual grooves 217 are provided for each ball 215. However, as an alternative, a pair of circumferentially extending grooves 217 could be formed around the entire circumference of the mandrel 205, one corresponding to the rearward set of balls 215b and the other for the forward row of balls 215a.

The grooves 217 are formed with the ramp 216 in the form of a transition surface from a rearward lower region 218 (of smaller diameter), where the locking elements 215 lie in the disengaged position to an upper region 219 (of greater diameter) where the elements lie in the engaged position. The upper regions 219 of the grooves 217 are formed as flat surfaces, parallel to the cages 213, but could take the form of depressions, to help maintain the deployed balls 215 in the engaged position.

Figure 16:
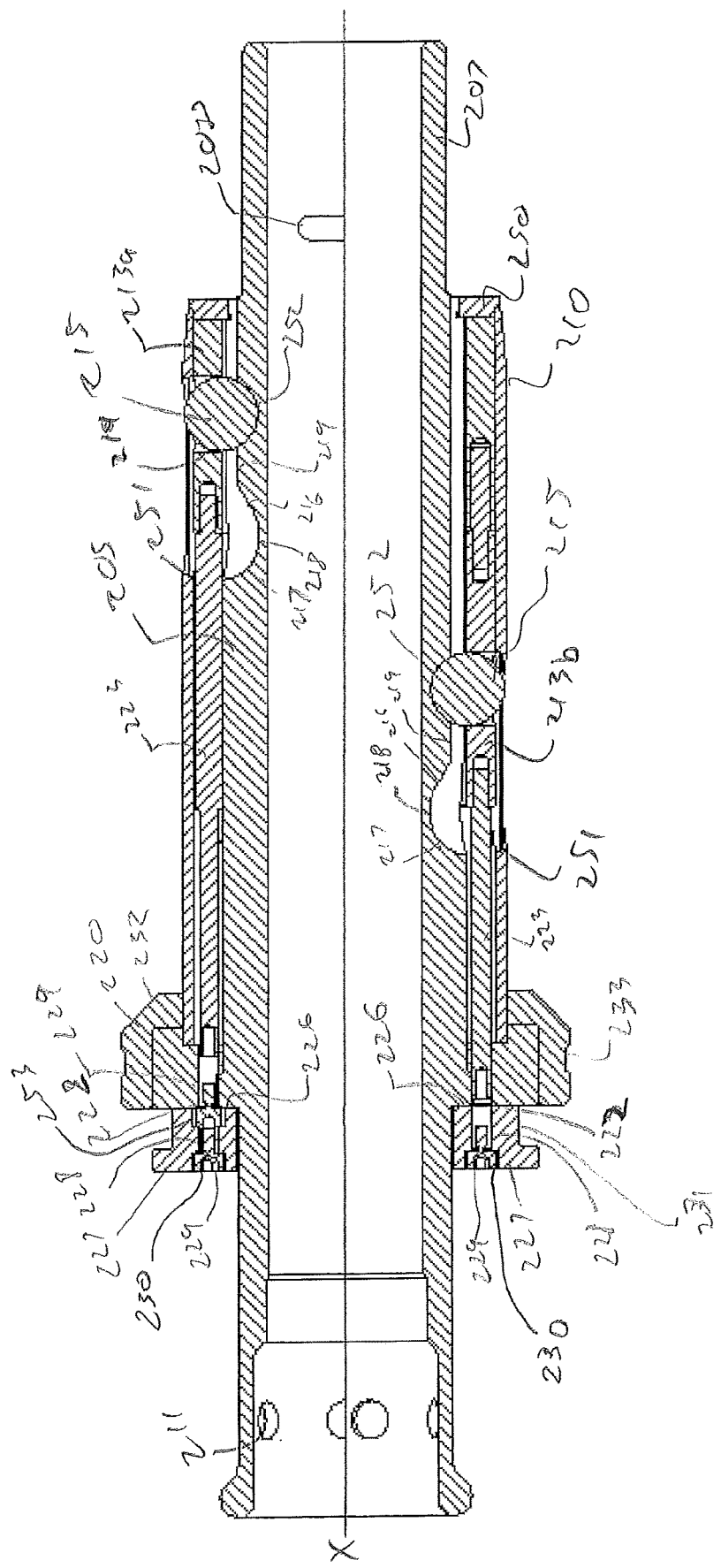
FIG. 16 is a section through the connector of FIGS. 13 to 15 taken along the same angles and with the locking elements in a detached position.
Figure 17:
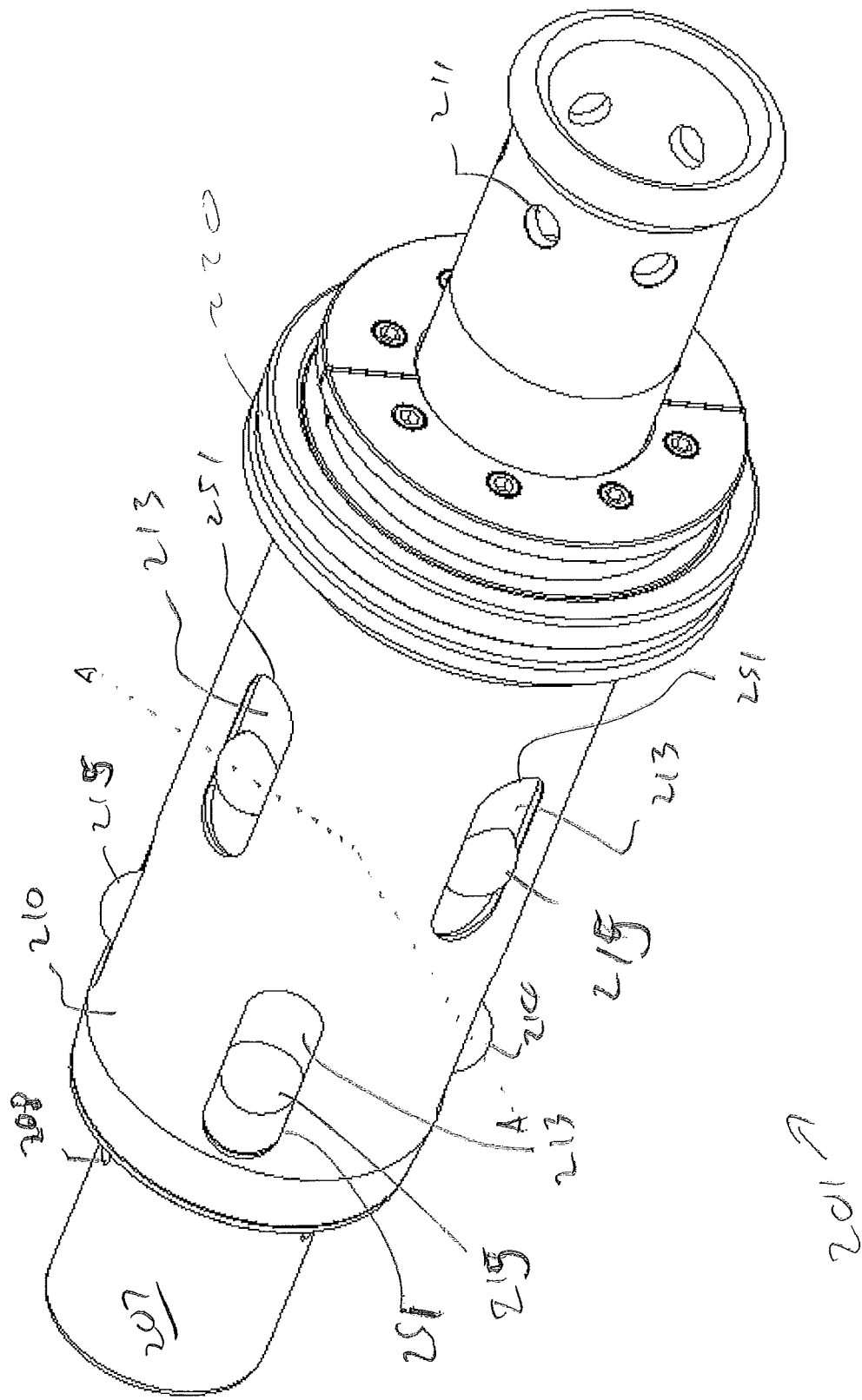
FIG. 17 is a rear isometric view of the connector of FIGS. 13 to 16 with the locking elements in the engaged position.
Figure 18:
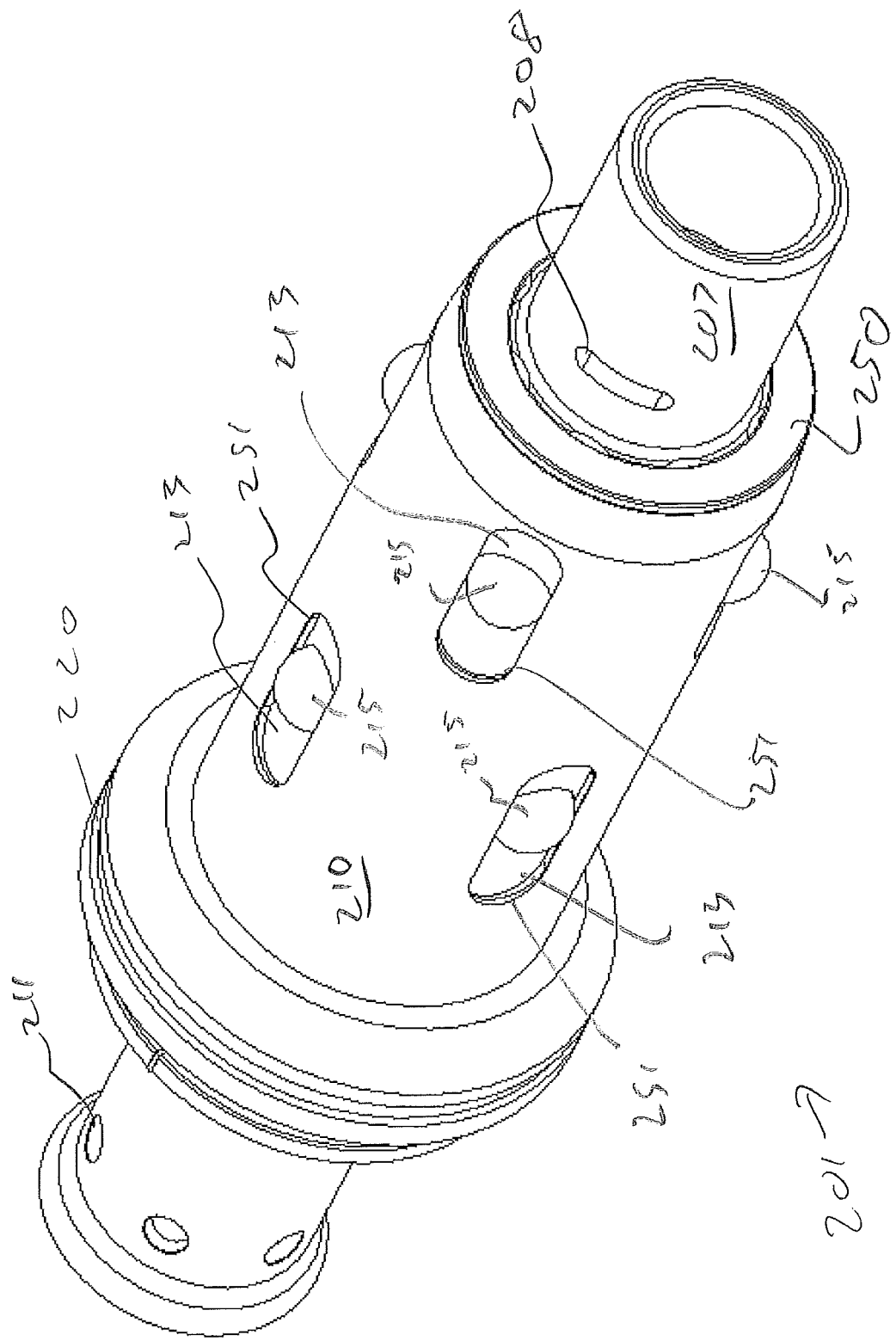
FIG. 18 is a front isometric view of the connector of FIGS. 13 to 16 with the locking elements in the engaged position.
Figure 19:
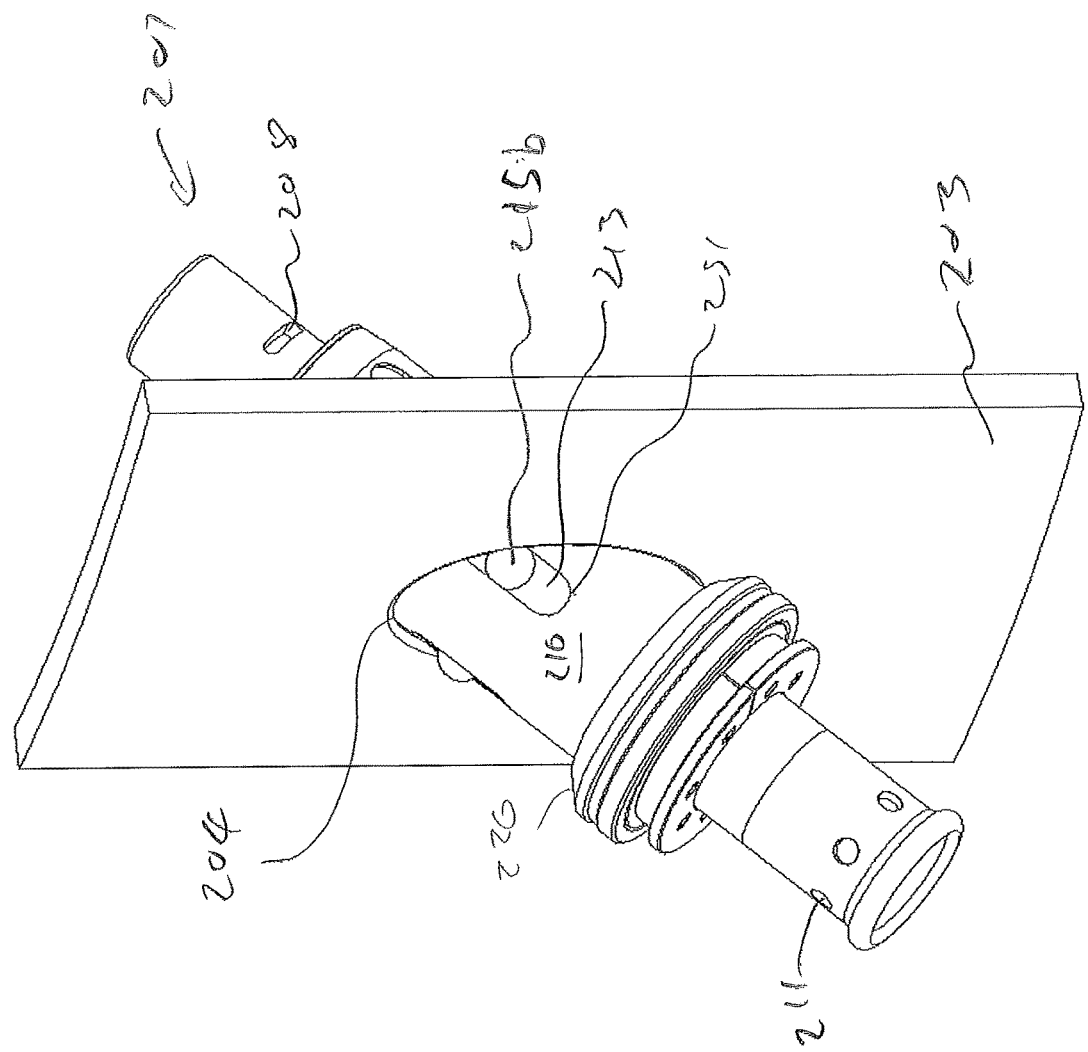
FIG. 19 is a rear isometric view of the connector of FIGS. 13 to 16 inserted into the aperture of a support pillar, the latter shown part-cutaway.
Figure 20:
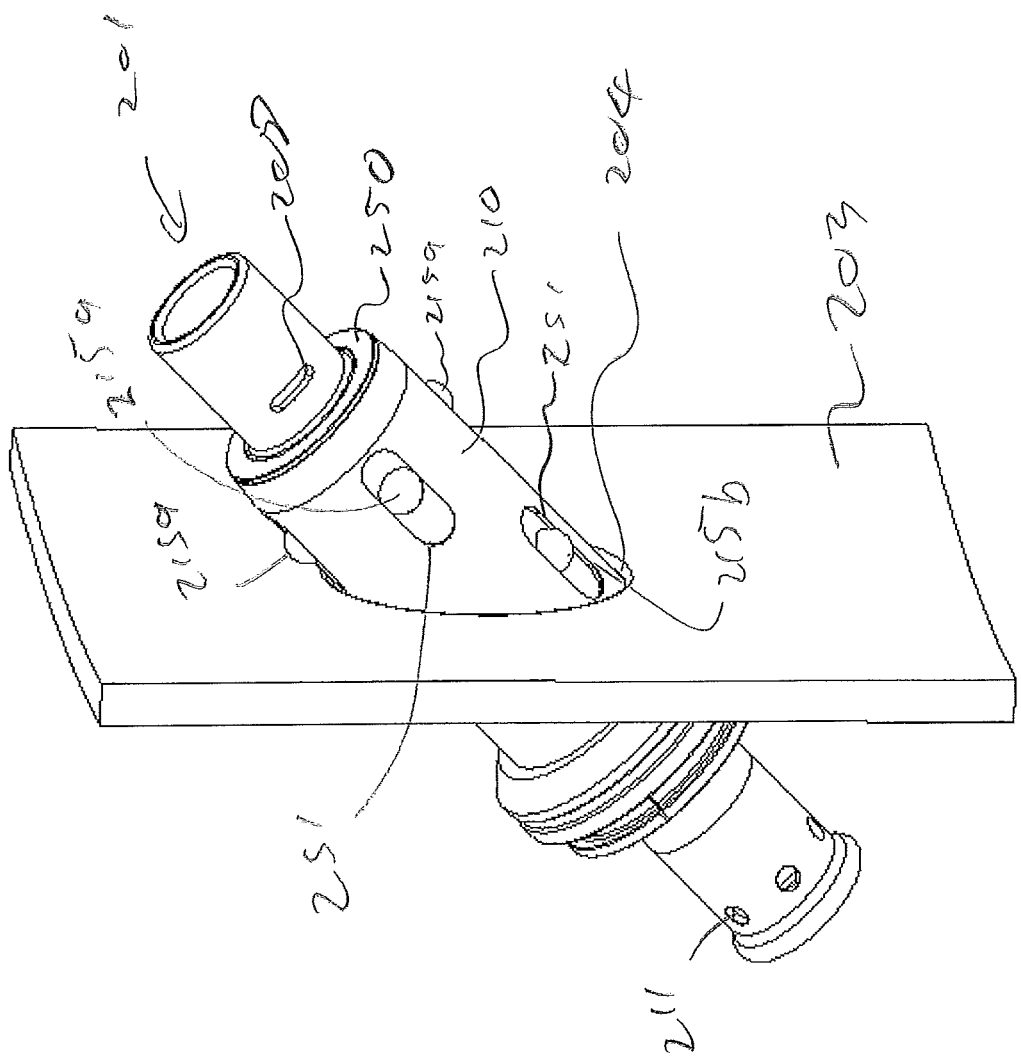
FIG. 20 is a front isometric view of the connector of FIGS. 13 to 16 inserted into the aperture of a support pillar, the latter shown part-cutaway.
Figure 21:
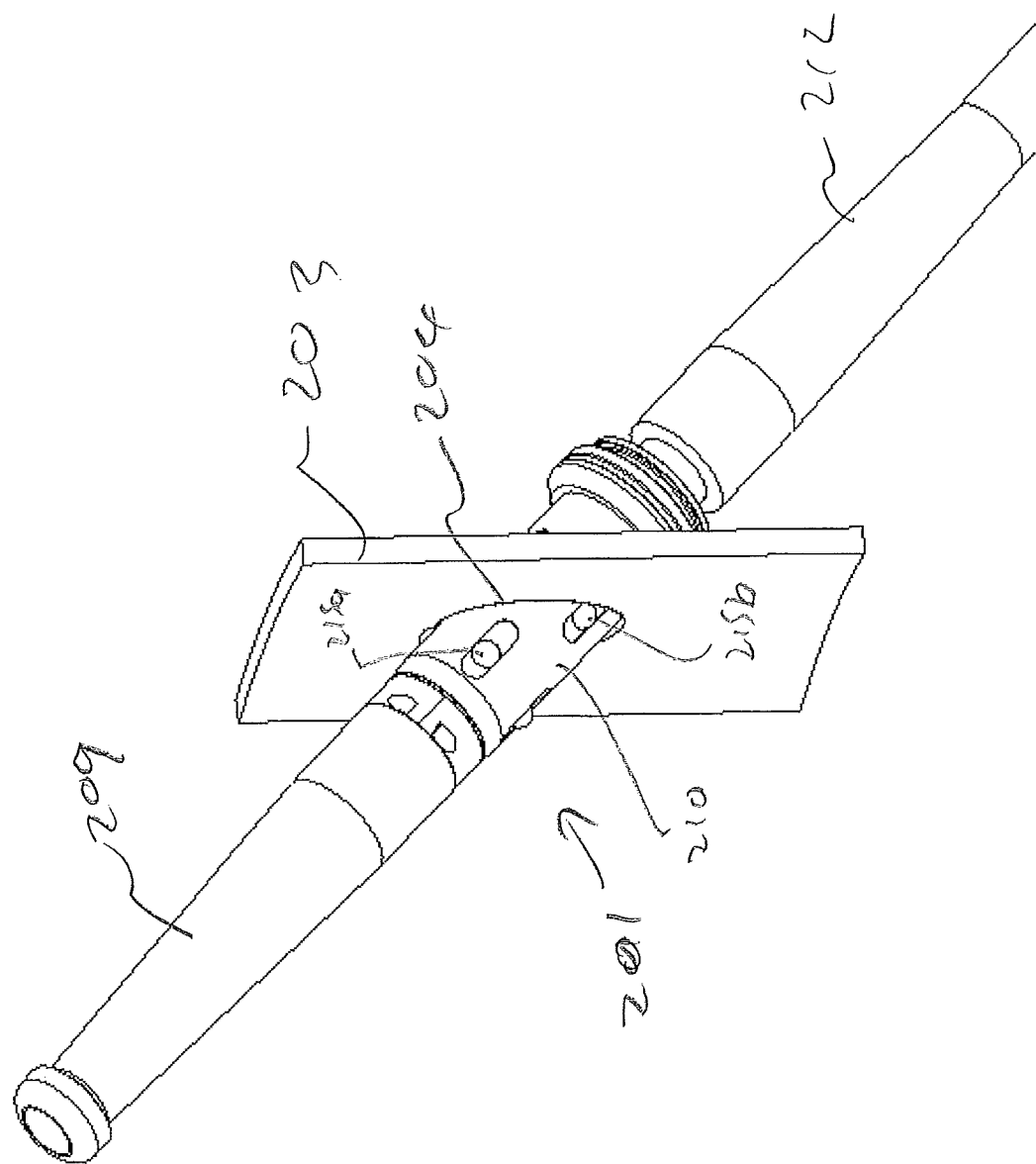
FIG. 21 is a front isometric view of the connector of FIGS. 13 to 16 attached to a bend restrictor at the front and a bend stiffener at the rear and inserted into the aperture of a support pillar, the latter shown part-cutaway.
Figure 22:
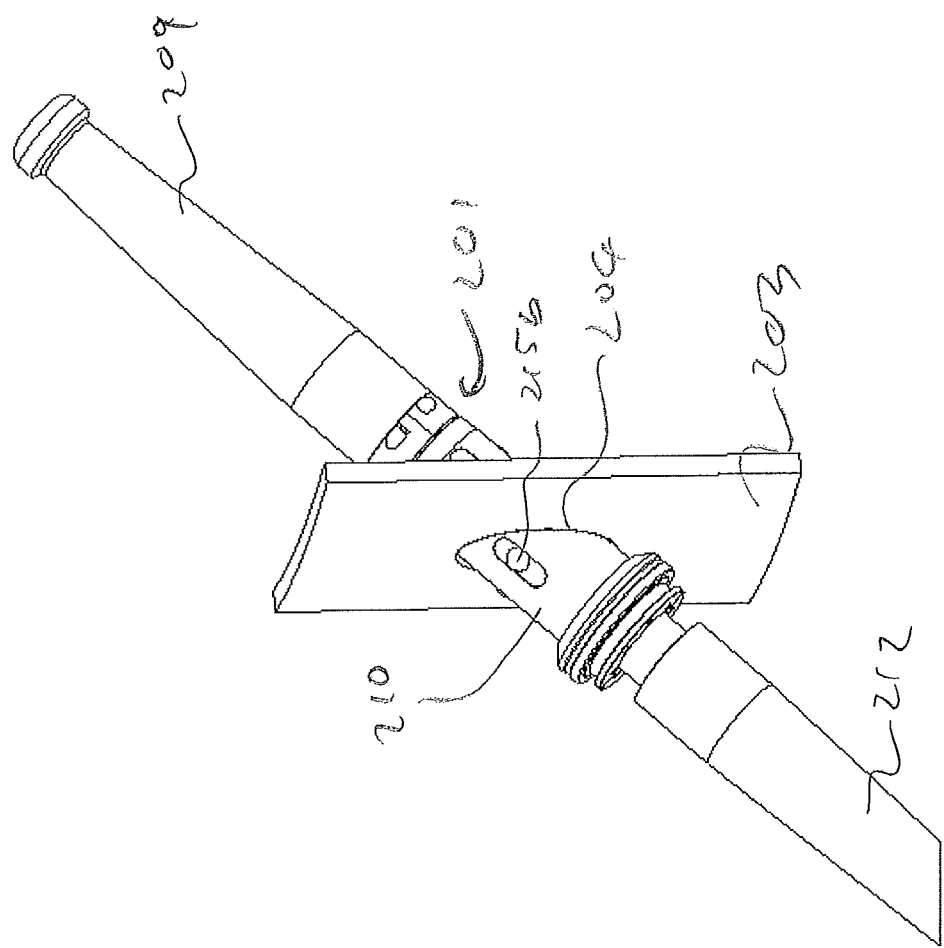
FIG. 22 is a rear isometric view of the connector of FIGS. 13 to 16 attached to a bend restrictor at the front and a bend stiffener at the rear and inserted into the aperture of a support pillar, the latter shown part-cutaway.

In contrast to the first embodiment, each of the grooves 217 of the second embodiment is provided with a second lower region 252 having a smaller diameter than the upper region 219 and situated in front of the upper region 219, into which the balls 215 can move in a "detached" position shown in FIG. 16.

The rear of the cages 213 are attached to rods/pins 223, each rearward cage 213b connected to a single rod/pin 223, and the forward cage connected by a series of rods/pins 223, each of which extends into a tubular housing 220 which has a frustoconical forward end or "stop" 232.

The drawings are simplified, but once again, a series of cavities 221 are formed around the connector 201 between the tubular housing 220 and the mandrel 205, one cavity 221 aligned with each cage rod/pin 223. Each rod/pin 223 can slide rearward into its corresponding cavity, as the cages 213 slide rearwardly. At the rear of each cavity 221, an aperture 222 is provided, through which a rod/pin 223 connected to the rear of each respective cage 213 can extend.

In the same manner as the first embodiment, around each rod 223, connected near its forward end, is a spring element, in the form of a helical compression spring (not shown). A stop surface (not shown) is provided by a radially outwardly extending flange 226 formed in the mandrel 205, which forms part of the rear wall of the cavity 221. The helical spring (not shown) is also held in position at its rear by connection to the tubular housing 220.

Each spring element (not shown) resiliently biases the respective rod 223 (and hence the respective cage 213) forwards. Accordingly, the bias urges the balls 215 up the ramp surface 216 to the engaged position in the upper regions 219 of the grooves 217. To the rear of the flange 226, release means in the form of a release collar 227 is slidably mounted on the mandrel 205. The release collar 227 is provided with apertures/bores 228, corresponding to the apertures 222, which the rods 223 extend through. The apertures 228 through the release collar 227 are counter-bored/countersunk at the rear, and the rods 223 are attached to the release collar 227 by means of countersunk screws/bolts 229 provided with extensions in the form of flares at their rear, which extend into the countersink/counterbore 230.

The rods/pins 223 connected to the forward cage 213a are connected via a pair of countersunk bolts, one of which has its head connected to the other bolt, its head being provided in a countersink/counterbore 253 provided in the front of the release collar 227, thereby tethering the release collar to the forward cage, such that under ordinary conditions they move in tandem as the balls 215 of the forward cage 213a move between the engaged and disengaged positions.

On the other hand, the connection between the rods 223 attached to the rearward cages 213b is such that when the resilient bias of the spring elements is overcome individual cages 213b can move rearwards independently of each other, and as they do so, the rods 223 of the moving cages 213 slide out of the rear of the release collar 227.

In the engaged position, the release collar 227 is mounted adjacent the rear of the flange 226, and the resilient bias of the springs holds it in the operative position. However, as mentioned above, the collar 227 is mounted to be able to slide on the mandrel 205. The release collar 227 is provided with gripping means 231 in the form of a circumferential groove, and a similar gripping means 233 in the form of a circumferential groove is formed in the tubular housing 220. Consequently, a hydraulic horseshoe clamp (not shown) or similar actuator, mounted to the gripping means by ROV (remotely operated underwater vehicle) may be connected.

Thus, the actuator can pull the release collar 227 rearwards, against the resilient bias, to a release position. Pulling the release collar 227 backwards, causes the pins/rods 223 to be pulled backwards (as a consequence of the flared ends of the screw/bolt 229), thus pulling the cages 213 rearward and allowing the balls 215 to move into the disengaged/stowed position.

This allows for non-destructive removal. However, in order to allow for removal without the use of an ROV, the bolts 229 connecting the rods to the release collar are tension bolts, which break under a certain load (e.g. ten tonnes). Consequently, a pull-in head could be used to pull/push the connector 201 out of the support pillar 203, and provided sufficient force is applied to overcome the tensile limit of the bolts, the balls 215 will move forward and radially inward to the "detach" position shown in FIGS. 16 and 25.

In use, a cable (not shown) is threaded through the bore 206 of the mandrel 205 and attached to the connector 201 by conventional means. A bend restrictor 209 is then attached to the nose cone and a bend stiffener 212 is connected to the rear of the connector 201.

The front of the cable (not shown) extending out of the front of the connector is then pulled in to the support pillar 203 of a wind turbine generator (or the like), through the aperture 204 which extends at an oblique angle (e.g. 60 degrees) through the support pillar 203. As the cable is pulled in, the resilient spring elements will be urging the cages 213 forwards and hence urging the balls 215 into the engaged position (radially outwards), but not beyond the engaged position as shown in FIGS. 13, 17, 18, 19 and 20. Once the nose cone 207 begins to enter the aperture, because it is at an oblique angle, one or two of the balls 215a in the forward row will contact the outside edge of the aperture 204. The aperture 204 is normally angled downwards, so the lowermost balls 215a will contact the outside edge of the aperture 204 first.

As the cable (not shown) continues to be pulled into the support pillar 203, pulling the connector 201 inwards, the balls 215a which abut the edge, will be pushed rearwards, forcing the cage 213a, to which they are attached, backwards against the resilient bias of their respective springs (not shown), so as to move the release collar 227 rearwards as the balls 215a that are moving through the aperture 204 move backwards and inwards down the ramps 216.

As the connector 201 continues to move through the aperture, balls 215a in the upper region of the forward row will come into contact with the outside edge of the aperture 204 and move inwardly. Once all the balls 215 in the forward row have passed through the aperture 204, the resilient bias of the helical springs will force the cage 213a forward, moving the balls 215a forward, up the ramps 216 and outward into the engaged position. This forward motion of the cage 213a with balls 215a in the forward row also brings the release collar forward providing a visual indication from outside the support pillar 203 that the first row of balls 215a have all passed the inside edge of the aperture.

Figure 15:
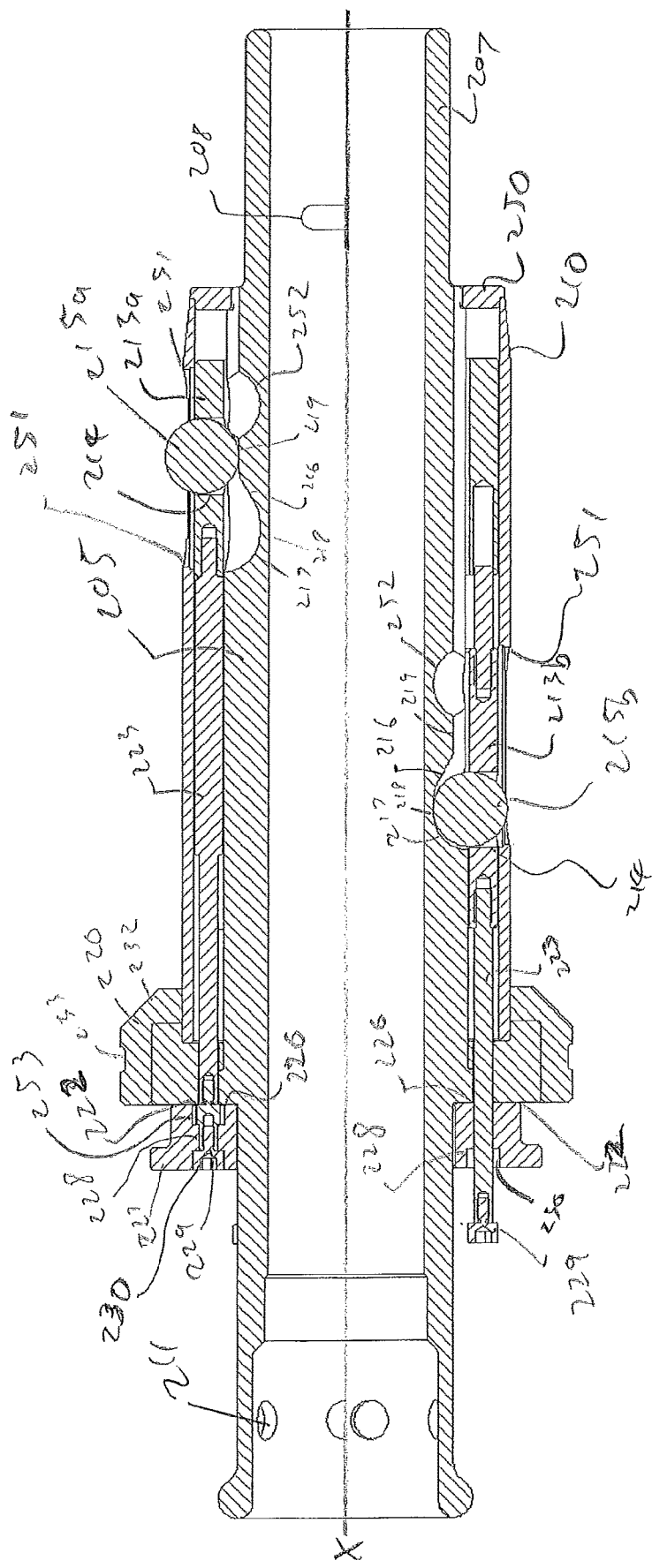
FIG. 15 is a section through the connector of FIGS. 13 and 14 taken along the same angles and with some locking elements in the engaged position and others in the disengaged position.

FIG. 15 shows the connector with the forward balls 215a in the engaged position, having passed though the aperture 204 and the rearward balls 215b that are visible in the disengaged position, as would be the case after the forward balls 215a have passed through the inside edge of the aperture 204, but the rearward balls 215b are coming through the aperture, having been pushed backwards (and inwards) by the outside edge of the aperture 204. Depending on the angle of the aperture 204, some of the balls 215b in the rearward row, may remain within the aperture 204 (between its inside and outside edges) even once the connector 201 has been pulled in to its fullest extent, at which point the tubular housing 220 (in particular the frustoconical forward surface 232 thereof) will abut the wall of the support pillar 203 to prevent over-insertion.

With a suitably angled and suitably thick support pillar 203 and appropriately spaced rows of balls 215, complete insertion of the connector 201 will lead to three balls 215 being inside the aperture in the engaged position, engaged with its inside edge and further balls 215a being inside the connector but not engaged with the edge, as well as further balls 215b being outside the aperture 204, taking no part in engagement. Depending on the orientation as the connector 201 is pulled through, the three balls 215 will either be two balls from the forward row of balls 215a and one from the rearward row of balls 215b, or two balls 215b from the rearward row and one from the forward row of balls 215a. This creates three points of contact on the inside edge of the aperture, providing a strong and stable connection.

Once the balls 215 are engaged inside the inside edge of the aperture 204, the connector cannot be accidentally pulled out. This is because pulling the connector pulls the balls against the inside edge, creating a force on the balls downward (i.e. radially inward) and longitudinally forward. However, the balls 215 are seated on a flat surface 219 and cannot move onto the grooves 217 which are tapered such that the transition surface of the ramps 216 reduces in diameter in the longitudinally rearward direction. Accordingly, the balls 215 cannot be forced down the ramps 216 and the connector is securely connected to the support pillar 203.

Under normal conditions (including relatively extreme subsea conditions), in which a relatively low outward force, is applied to the connector 201, the balls 215 cannot move forward into the lower region 252 (detached position), because the cages are operatively connected to the release collar 227 in such a way that they cannot move beyond a predetermined forward position (the position where the flares of the bolt 229 abuts the counterbore/countersink of the release collar).

However, as set out above, if it is desired to permanently remove the connector 201, a pull-in head (not shown) may be connected to the connector and the connector may be pulled/pushed out of the pillar using a very high force (e.g. greater than 50,000N, such as ten tonnes), so as to break the connection between the cages 213 and the release collar 227 and allow the balls 215a, 215b to move forward and radially inward to the detach position 252.

The connector 201 could be connected to another female member, such as a J-tube (not shown), as mentioned above, provided a suitable modification was made, such as provision of a flange to replicate the aperture 204. The connector 201 could even connect to a J-tube with a flange that is not necessarily angled, but instead perpendicular to the rows of balls 215. Either, or both of the front or rear row of balls 215 could engage behind a flange.

Figure 14:
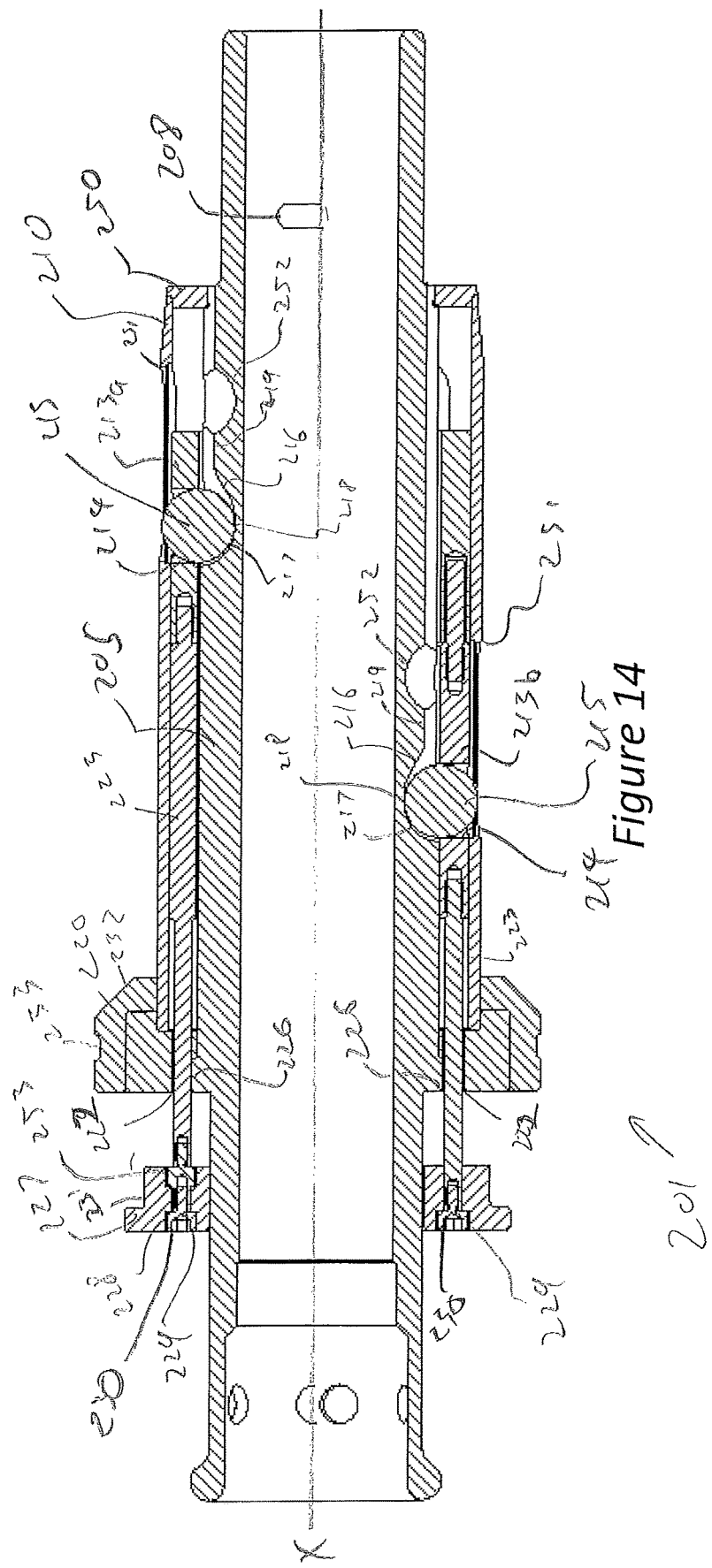
FIG. 14 is a section through the connector of FIG. 13, taken along the same angles and with the locking elements in the disengaged position.
Figure 23:
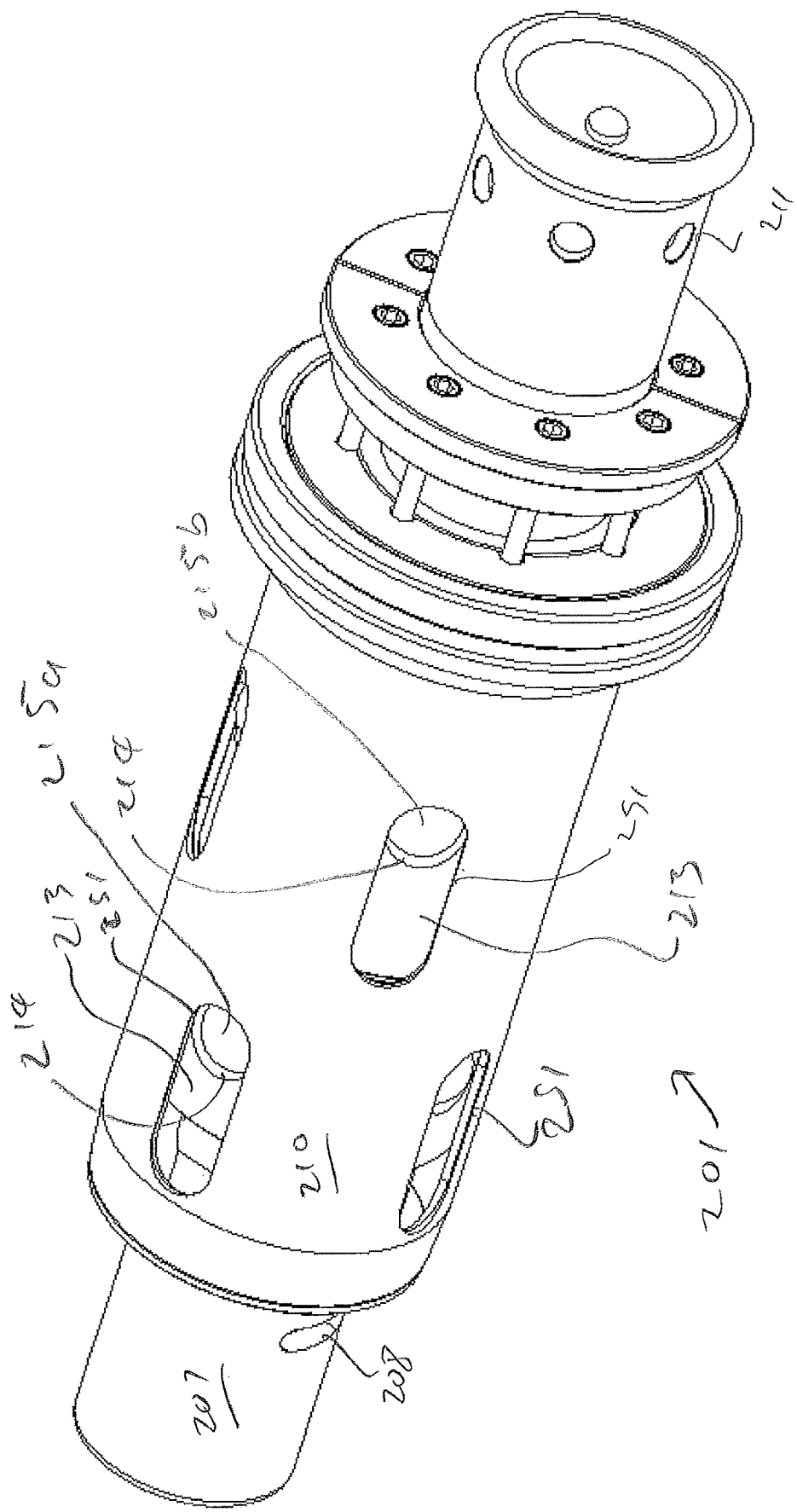
FIG. 23 is a rear isometric view of the connector of FIGS. 13 to 16 with all the locking elements in the disengaged position.
Figure 24:
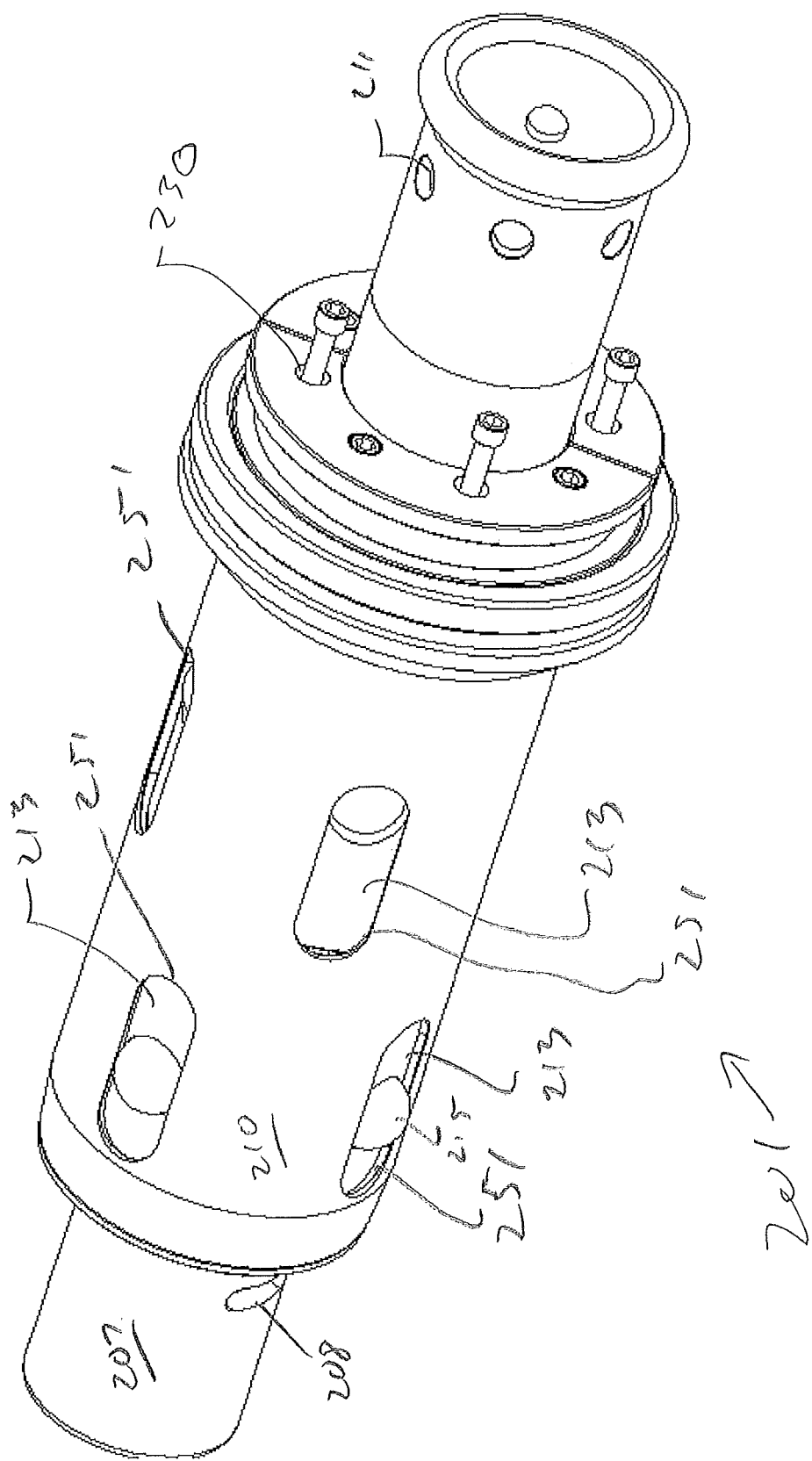
FIG. 24 is a rear isometric view of the connector of FIGS. 13 to 16 with some locking elements in the disengaged position and some locking elements in the engaged position.
Figure 25:
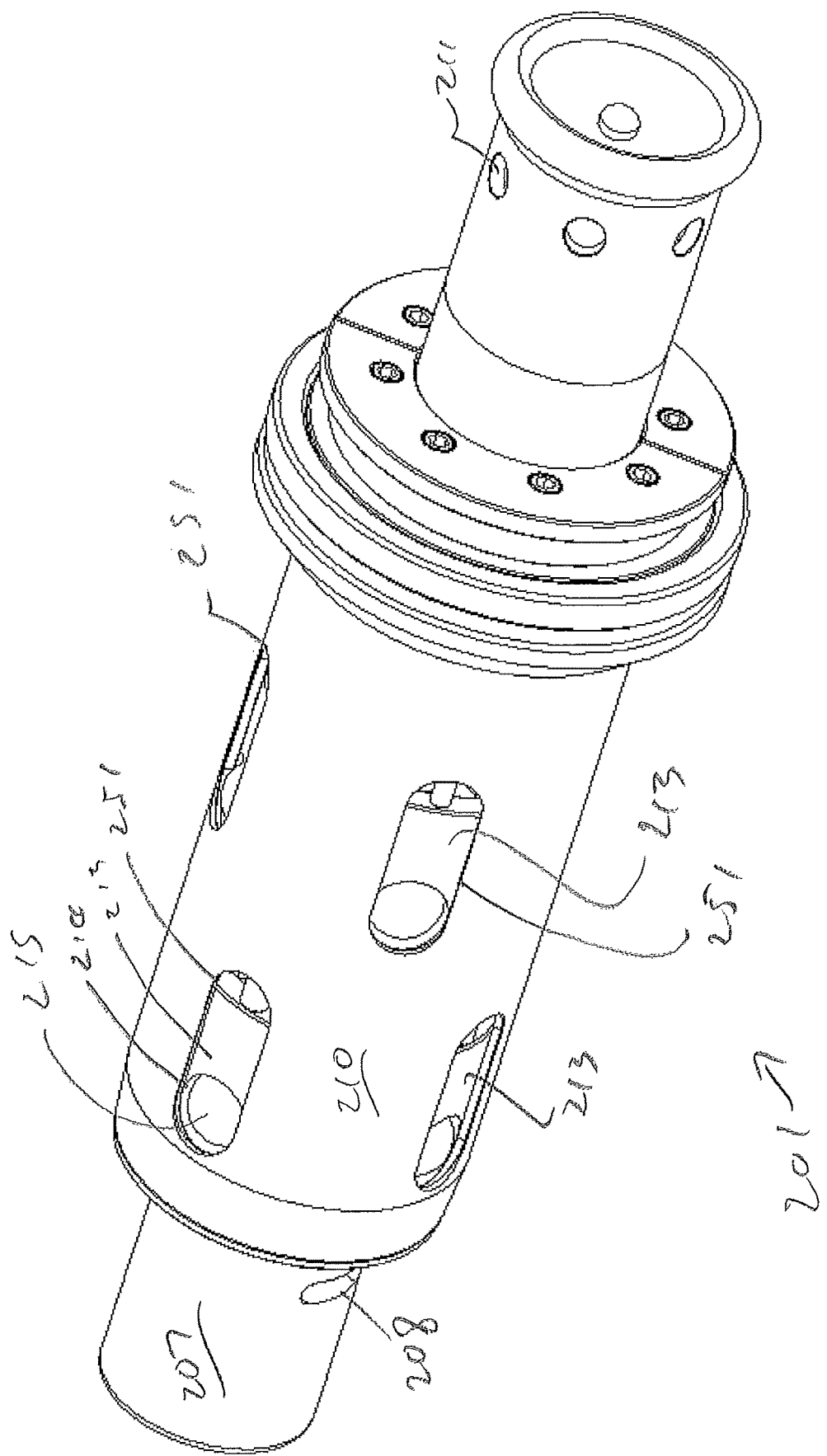
FIG. 25 is a rear isometric view of the connector of FIGS. 13 to 16 with the locking elements in the detach position.

To temporarily remove the connector 201 from an aperture 204 in a support pillar 203 (or other female member), the release collar 227 is pulled rearwards as shown in FIGS. 14 and 23 (e.g. by an actuator such as a horseshoe clamp). This rearward motion overcomes the resilient bias of all of the springs, and pulls all the rods 223 and cages 213a, 213b backwards—this in turn forces the balls 215 rearward and radially inward down the ramps 216 to the lower regions 218 of the grooves 217. With the balls 215 moved to this disengaged/stowed position, in which they are no longer urged radially outwardly, the connector 201 can be pulled out of engagement with the aperture 204 for maintenance/replacement etc. Once the release collar is no longer pulled apart from the tubular housing 220, the resilient bias of the springs (not shown) will bring it back into the operative position, adjacent the flange 226.

The above embodiments are described by way of example only. Many variations are possible without departing from the scope of the invention as defined in the appended claims.

The invention claimed is:

1. An elongate connector, comprising:
a plurality of locking elements;
a plurality of ramp surfaces; and
at least one cage, wherein the plurality of locking elements are arranged on the plurality of ramp surfaces and held in the at least one cage on the connector, whereby the at least one cage is moveable to move the plurality of locking elements along the plurality of ramp surfaces between an engaged position and a disengaged position; and
a sleeve arranged radially outward of the at least one cage and having slots therein, whereby the plurality of locking elements move radially outward through the slots from the disengaged position at which the plurality of locking elements are retracted and do not protrude from the slots to the engaged position at which the plurality of locking elements protrude radially from the slots.

2. An elongate connector according to claim 1 wherein the slots extend axially and the plurality of locking elements move axially as they move radially through the slot.

3. An elongate connector according to claim 1 wherein the slots are shaped to retain the plurality of locking elements in the connector.

4. A connector according to claim 1 wherein the plurality of locking elements are balls.

5. A connector according to claim 1 which is a male member, inserted in use into a female member in the form of an aperture, such that the plurality of locking elements engage with the edge of the aperture.

6. An elongate connector having a plurality of locking elements arranged on ramp surfaces and held in at least one cage on the connector whereby the at least one cage is movable to move the locking elements along the ramp surfaces from a disengaged position to an engaged position; the locking elements being movable in the at least one cage to a further, detach position, in which the connector prevents movement of the locking elements back to the disengaged position, wherein the at least one cage is operatively connected to part of the connector, the operative connection allowing the cage to move the locking elements between the engaged and disengaged positions and restricting motion to the detach position, the operative connection being breakable so as to allow movement to the detach position.

7. An elongate connector according to claim 6 wherein the locking elements move in the same radial sense from the engaged position to the disengaged position and from the engaged position to the detach position.

8. An elongate connector according to claim 7 wherein the locking elements move radially inwardly from the engage position to the disengaged position, and from the engaged position to the detach position.

9. An elongate connector according to claim 6 wherein the locking elements move in the same axial sense from the disengaged position to the engaged position and from the disengaged position to the detach position.

10. An elongate connector according to claim 6 wherein the at least one cage is operatively connected to a release collar.

11. A connector according to claim 6 comprising a release means operatively connected to the cages and operable to move the cages from the engaged position to the disengaged position, wherein the release means is a collar provided to the rear of the cages and connected thereto by pins, the pins extending through the rear of the collar and being provided with extensions such that rearward motion of the collar causes the pins to move rearward, moving the cages rearward and hence moving the locking elements to the disengaged position, but rearward movement of the cage simply causes the pins to move through the release collar without moving the release collar.

12. A connector according to claim 6 wherein the locking elements are balls.

13. A connector according claim 6 which is a male member, inserted in use into a female member in the form of an aperture, such that the locking elements engage with the edge of the aperture.

14. A connector according to claim 6 wherein a tension bolt, tension pin, shear bolt, or shear pin provides the breakable operative connection.

15. An elongate connector having a longitudinal axis, a plurality of locking elements arranged on ramp surfaces and held in a plurality of cages on the connector, whereby the cages are moveable to move the locking elements along the ramp surfaces between an engaged position and a disengaged position; wherein the plurality of cages are moveable independently of each other; wherein the plurality of cages are independently resiliently biased, and wherein the connector is a male member inserted in use into a female member in the form of an aperture, such that the locking elements engage with the edge of the aperture.

16. A connector according to claim 15 wherein the cages are moveable axially.

17. A connector according to claim 15 wherein the plurality of locking elements and the plurality of cages comprises at least three locking elements and at least three cages; and at least two of the cages are operatively connected to move simultaneously, but independently of at least one other cage.

18. A connector according to claim 15 wherein the plurality of locking elements and the at least one cage comprises at least four locking elements and at least four cages; and at least two of the cages are operatively connected cages, which move simultaneously, but independently of at least two other independent cages and the at least two other independent cages may move independently of each other and independently of the operatively connected cages.

19. A connector according to claim 15 wherein the locking elements are balls.

* * * * *